US011496225B2

(12) United States Patent
Rahman

(10) Patent No.: US 11,496,225 B2
(45) Date of Patent: Nov. 8, 2022

(54) SYSTEM AND METHOD FOR NETWORK DISTRIBUTION OF QUANTUM ENTANGLEMENT

(71) Applicant: AT&T Intellectual Property I, L.P., Atlanta, GA (US)

(72) Inventor: Moshiur Rahman, Marlboro, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 352 days.

(21) Appl. No.: 16/706,329

(22) Filed: Dec. 6, 2019

(65) Prior Publication Data

US 2021/0175976 A1 Jun. 10, 2021

(51) Int. Cl.
*H04L 9/08* (2006.01)
*H04B 10/70* (2013.01)

(52) U.S. Cl.
CPC ............ *H04B 10/70* (2013.01); *H04L 9/0855* (2013.01); *G02B 2207/114* (2013.01)

(58) Field of Classification Search
CPC .... H04B 10/70; H04B 10/2581; H04B 10/85; H04B 10/25891; H04L 9/0855; H04L 9/0852; H04L 63/04; H04L 63/08; H04L 29/12594; H04L 61/1511; H04L 61/2092; H04L 61/3015; H04L 29/12216; H04L 63/0876; H04L 29/12301; H04L 63/164; H04L 63/168; H04L 61/2007; H04L 61/35; H04L 63/0478; H04L 45/00;

(Continued)

(56) References Cited

U.S. PATENT DOCUMENTS 7,161,929 B1 * 1/2007 O'Neill ............ H04L 29/12216
370/349
8,699,876 B2 * 4/2014 Brodsky ............ H04Q 11/0005
398/68

(Continued)

OTHER PUBLICATIONS

Masoumeh Shirichian, "Protocol for Routing Entanglement in the Quantum Ring Network", IEEE 2018 9th International Symposium on Telecommunications (IST) (pp. 658-663) (Year: 2018).*

(Continued)

*Primary Examiner* — Samson B Lemma
(74) *Attorney, Agent, or Firm* — Guntin & Gust, PLC; Ralph Trementozzi

(57) ABSTRACT

Aspects of the subject disclosure may include, for example, identifying a request to facilitate communications between first and second processing nodes, determining that the communications are to be established via quantum teleportation between, and identifying a network path comprising a first path segment to obtain a quantum channel, wherein quantum entanglement is established between the first and second processing nodes based on transportation of a first quantum entangled object via the quantum channel. A classical communication channel is facilitated between the first and second processing nodes, adapted to exchange between the nodes, quantum state information of a measurement performed upon the first quantum entangled object. Information is exchanged between the first and second processing nodes via the quantum channel according to the transported first quantum entangled object and the exchanged quantum state information. Other embodiments are disclosed.

20 Claims, 12 Drawing Sheets

(58) Field of Classification Search
CPC ............... H04L 61/303; H04L 61/6004; H04L 63/0485; H04L 63/1416; H04L 63/1458; H04L 67/141; H04L 29/12066; H04L 29/12783; H04L 63/0272; H04L 45/24; H04L 61/2076; H04L 63/1408; H04L 41/00; H04L 63/0428; H04L 67/14; H04L 63/0421; H04L 63/0407; H04L 63/1466; H04L 29/12801; H04L 63/0435; H04L 29/1232; H04L 45/28; H04L 12/4641; H04L 63/0227; H04L 9/30; H04L 9/0833; H04L 9/0858; H04L 9/0844; H04L 29/12311; H04L 45/02; H04L 61/2084; H04Q 11/0005; G06F 21/606; G06F 16/951; H04J 14/0283; H04J 14/0278; H04J 14/02; H04W 12/04; H04W 8/087; H04W 40/02
USPC ........................................................ 380/256
See application file for complete search history.

(56) References Cited

U.S. PATENT DOCUMENTS

| | | | | |
|---|---|---|---|---|
| 9,264,226 | B2* | 2/2016 | Harrison | G06N 10/00 |
| 9,800,352 | B2* | 10/2017 | Frohlich | H04B 10/70 |
| 10,951,326 | B1* | 3/2021 | Reilly | H04B 10/90 |
| 2004/0264958 | A1 | 12/2004 | Zoller et al. | |
| 2008/0089696 | A1* | 4/2008 | Furuta | H04L 9/0855 |
| | | | | 398/175 |
| 2012/0148237 | A1* | 6/2012 | Harrison | G06N 10/00 |
| | | | | 398/180 |
| 2012/0155870 | A1* | 6/2012 | Harrison | G06N 10/00 |
| | | | | 398/45 |
| 2017/0207858 | A1 | 7/2017 | Drost et al. | |
| 2018/0013556 | A1 | 1/2018 | Saavedra | |
| 2018/0152295 | A1 | 5/2018 | Drost et al. | |
| 2018/0241553 | A1 | 8/2018 | Lucamarini et al. | |
| 2019/0260581 | A1 | 8/2019 | Su et al. | |
| 2021/0105135 | A1* | 4/2021 | Figueroa | H04L 9/0858 |
| 2022/0006534 | A1* | 1/2022 | Reilly | H04B 10/70 |

OTHER PUBLICATIONS

"Modeling and Experimental Tools with Prof. Magnes", pages. vassar.edu/magnes/2018/12/15/quantum-entanglement-draft/, Aug. 22, 2019, 8.

"Orbital angular momentum of light the orbital", https://en.wikipedia.org/wiki/Orbital_angular_momentum_of_light, 2018.

"Quantum key distribution", https://en.wikipedia.org/wiki/Quantum_key_distribution, Aug. 22, 2019, 17.

"Spontaneous parametric downconversion", https://en.wikipedia.org/wiki/Spontaneous_parametric down-conversion, Aug. 22, 2019, 6.

Catalano, Jesse L. , "Spontaneous Parametric Down-Conversion and Quantum Entanglement", University Honors Theses. Paper 52, 2014, 27.

Littmann, Dan , "The need for deep fiber", Deloitte, Communications infrastructure upgrade, Jul. 2017, 28.

Reid, M.D. et al., "The Einstein-Podolsky-Rosen paradox: from concepts to applications", Rev.Mod. Phys. 81, 1727, 2008.

Tittel,, W. et al., "Quantum Cryptography Using Entangled Photons in Energy-Time Bell States", vol. 84, No. 20 Physical Review Letters, May 15, 2000, 4.

* cited by examiner

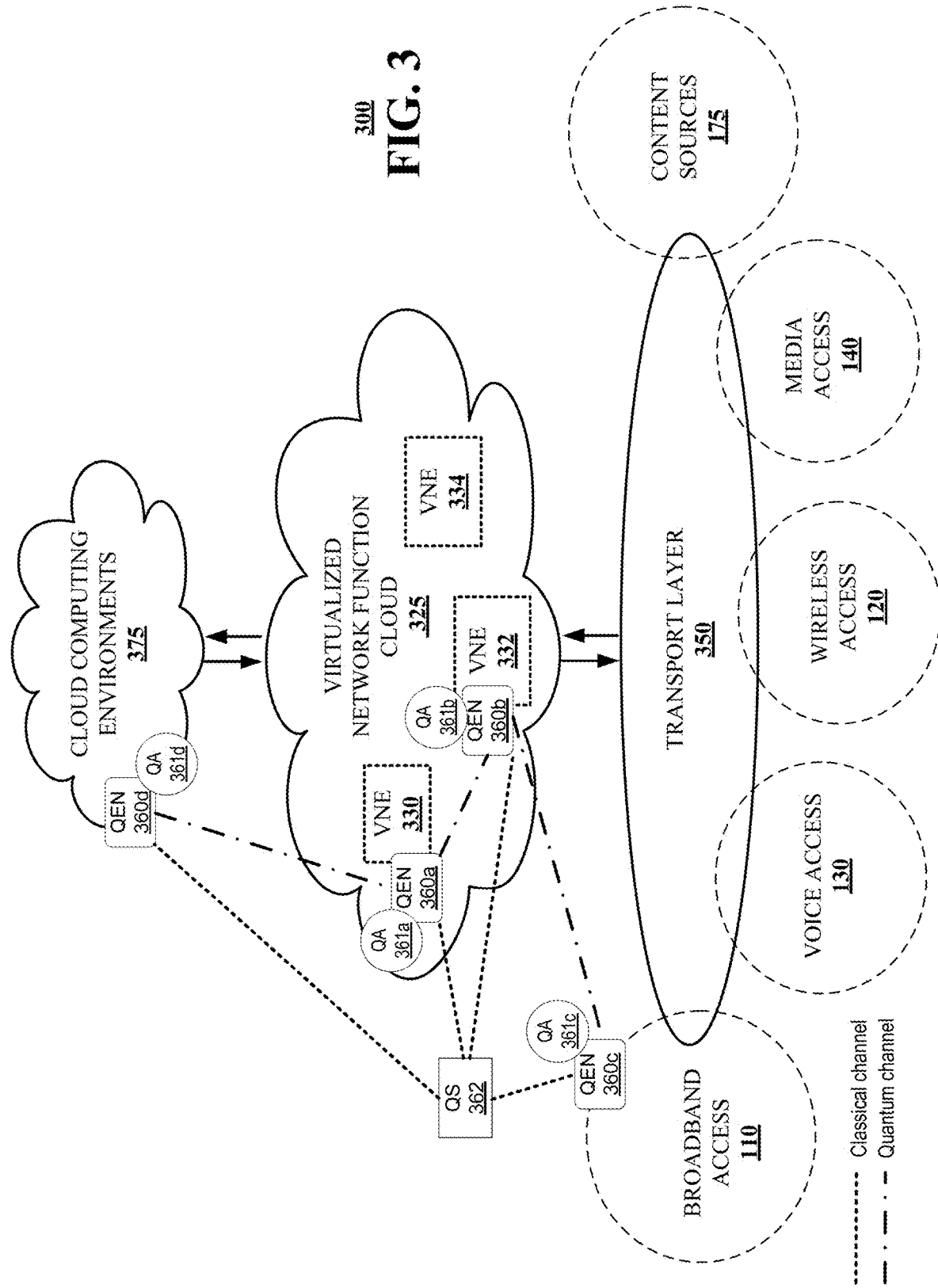

SYSTEM AND METHOD FOR NETWORK DISTRIBUTION OF QUANTUM ENTANGLEMENT

FIELD OF THE DISCLOSURE

The subject disclosure relates to a system and method for network distribution of quantum entanglement.

BACKGROUND

Quantum networks support an exchange of information in the form of quantum bits, also called qubits, between physically separated endpoints. Quantum networks include quantum processors adapted for storing and processing information and quantum channels that link the processors. Sharing entanglement over endpoint nodes through a quantum channel enables physical implementations of quantum cryptography, quantum secret sharing and distributed quantum computation.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
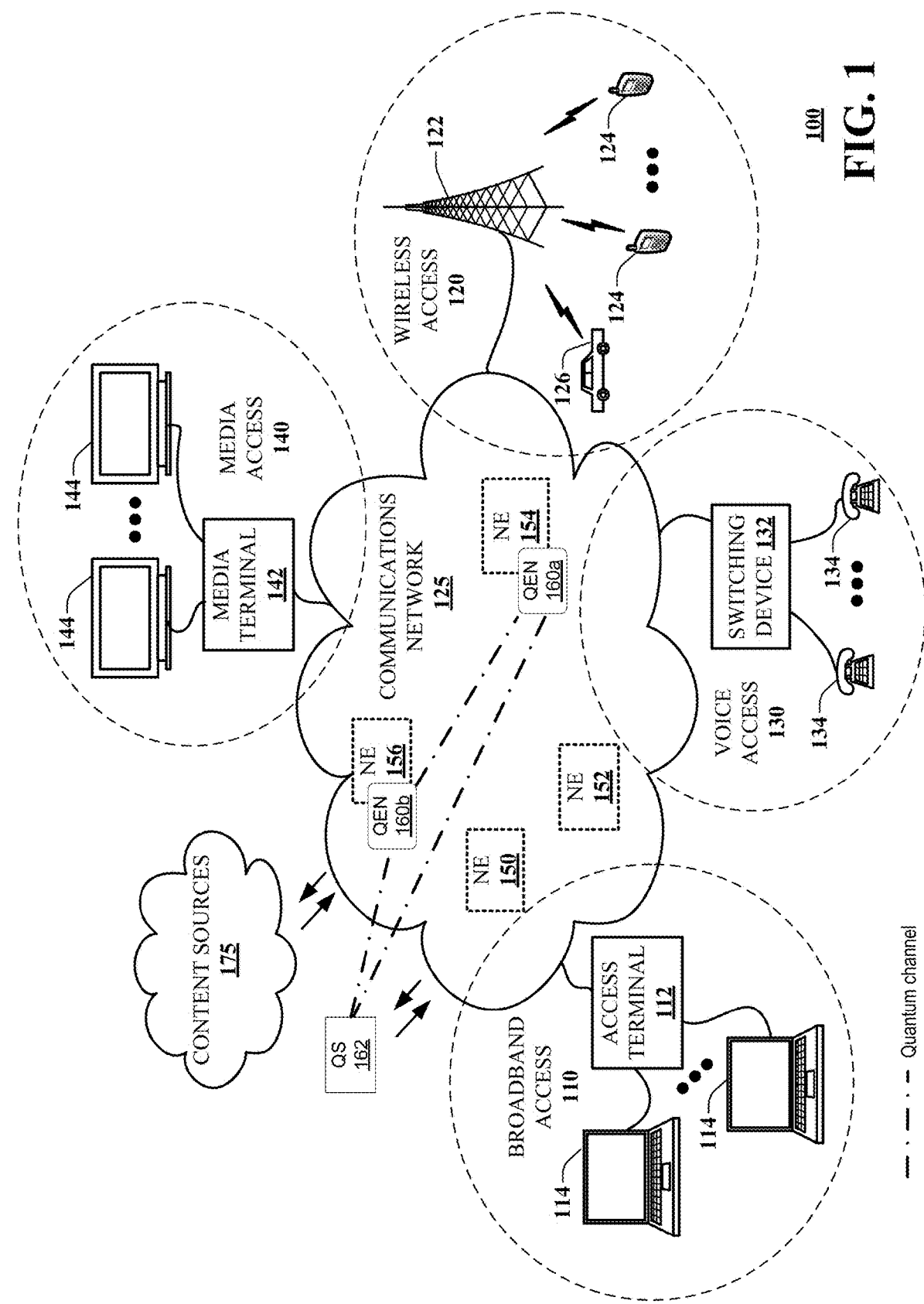
FIG. 1 is a block diagram illustrating an exemplary, non-limiting embodiment of a communications network in accordance with various aspects described herein.

The subject disclosure describes, among other things, illustrative embodiments of quantum enabled network architectures adapted to incorporate an entanglement distribution function into a telecommunication infrastructure to facilitate an efficient and reliable distribution of quantum entangled objects between nodes of a network. The example embodiments can be incorporated into existing telecommunications infrastructures by incorporating quantum enable nodes (QEN), e.g., in combination with an optical fiber network, such as a metropolitan fiber network, and in combination with local quantum agents (QA) that manage interactions between the QEN and a source of entangled objects. The quantum enablement provides generation of groups of quantum entangled objects and efficient distribution of the entangled objects among those nodes of the telecommunication network that require quantum processing. Other embodiments are described in the subject disclosure.

One or more aspects of the subject disclosure include a system, including a processing system having a processor and a memory that stores executable instructions that, when executed by the processing system, facilitate performance of operations. The operations include receiving a request for communications between a first communication node and a second communication node, determining to provide a quantum channel for the communications, and identifying a first network routing path of a group of network routing paths according to the quantum channel. Quantum entanglement is established between the first communication node and the second communication node based on transportation of a first quantum entangled photon of a first pair of quantum entangled photons via the first network routing path, resulting in a transported first quantum entangled photon of the first pair of quantum entangled photons. The operations further include initiating a classical communication channel between the first communication node and the second communication node, the classical communication channel adapted to communicate quantum state information from the first communication node to the second communication node to obtain communicated quantum state information, wherein the quantum state information is obtained from a measurement performed upon a second quantum entangled photon of the first pair of quantum entangled photons. Information is exchanged between the first communication node and the second communication node via the quantum channel according to the transported first quantum entangled photon of the first pair of quantum entangled photons and the communicated quantum state information.

One or more aspects of the subject disclosure include a process that includes detecting, by a processing system including a processor, a request to facilitate communications, to obtain requested communications, between a first communication node and a second communication node, determining, by the processing system, that the requested communications are to be established via quantum teleportation between the first communication node and the second communication node, the quantum teleportation based on a quantum entanglement among a first group of quantum entangled objects, and identifying, by the processing system, a network path of a group of network paths according to a quantum channel. Quantum entanglement is established between the first communication node and the second communication node based on transportation of a first quantum entangled object of the first group of quantum entangled objects via a first path segment of the network path, resulting in a transported first quantum entangled object. The process further includes facilitating, by the processing system, a classical communication channel between the first communication node and the second communication node, the classical communication channel supporting an exchange of quantum state information of the first quantum entangled object from the first communication node to the second communication node to obtain exchanged quantum state information. Information is exchanged between the first communication node and the second communication node via the quantum channel according to the transported first quantum entangled object and the exchanged quantum state information.

One or more aspects of the subject disclosure include a non-transitory, machine-readable medium, comprising executable instructions that, when executed by a processing system including a processor, facilitate performance of operations. The operations include identifying a request to facilitate communications between a first processing node and a second processing node, determining that the communications are to be established via quantum teleportation between the first processing node and the second processing node, the quantum teleportation based on a quantum entanglement among a group of quantum entangled objects, and identifying a network path comprising a first path segment to obtain a quantum channel. Quantum entanglement is established between the first processing node and the second processing node based on transportation of a first quantum entangled object of the group of quantum entangled objects via the quantum channel, resulting in a transported first quantum entangled object. The operations further include facilitating a classical communication channel between the first processing node and the second processing node, the classical communication channel adapted to exchange quantum state information of a measurement performed upon the first quantum entangled object from the first processing node to the second processing node to obtain exchanged quantum state information. Information is exchanged between the first processing node and the second processing node via the quantum channel according to the transported first quantum entangled object and the exchanged quantum state information.

Referring now to FIG. 1, a block diagram is shown illustrating an example, non-limiting embodiment of a communications network 100 in accordance with various aspects described herein. For example, communications network 100 can facilitate in whole or in part a generation of a quantum entangled group of objects, such as entangled photons, responsive to a request for processing, e.g., communication between remote processing nodes, that utilizes quantum entanglement. In particular, the quantum entangle objects of the group of objects, e.g., entangled photons, are generated and distributed in an efficient and reliable manner to one or more of the processing nodes based on the request. Quantum agents (QA) are employed, that in at least some applications, evaluate communication and/or processing requests to determine whether quantum entanglement is desired. The network 100 can include a local QAs at one or more of the processing nodes. Having identified communications and/or processing nodes to be entangled, one or more quantum channels are identified to support transportation of the entangled objects from an entanglement source to remote destinations to facilitate quantum entanglement between endpoints of the requested link. It is envisioned that in at least some applications, one or more quantum repeaters may be necessary, in which case a swapping of quantum information or states can be employed to extent an entangled state between the source and the destination by way of the repeater. Accordingly, the quantum channels can be established between one or more of the quantum source, a source processing node, a destination processing node and possibly one or more intermediate nodes, such as a quantum repeater node.

In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc., for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc., can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

The various examples and architectures disclosed herein facilitate distribution of quantum entanglement, a building block of the entangled quantum networking. In at least some applications, the quantum entanglement distribution architectures are employed in combination with wireless communications, e.g., radio access networks (RAN), including wireless applications according to standards of the 3rd Generation Partnership Project (3GPP). Examples include, without limitation, the Global System for Mobile Communications (GSM) standard, and related 2G and 2/5G standards, including General Packet Radio Service (GPRS) and Enhanced Data rates for GSM Evolution (EDGE), $3^{rd}$ generation (3G) standards, such as Universal Mobile Telecommunications System (UMTS), $4^{th}$ generation (4G) standards, such as Long-Term Evolution (LTE), LTE Advanced, and $5^{th}$ generation (5G) standards, such as 5G NR (New Radio).

The exchange of quantum information between remote locations is achievable through quantum entanglement distribution between remote nodes, e.g., according to an Einstein, Podolsky, and Rosen (EPR) pair, such as an entangled pair of photons. Example embodiments may utilize optical communication channels to distribute or exchange quantum keys. Example optical communication channels may include free space optical channels, satellite to ground optical channels, and/or optical fiber communication channels. For many applications of quantum information, such as quantum key distribution (QKD), super dense coding, and teleportation, the entanglement distribution, that is the distribution of the entangled qubits between a source node and a destination node is a core requirement. Such entanglement distribution may also be incorporated into any realization of an entangled core network structure of a quantum Internet.

A qubit, for example, represents a unit of quantum information that may include additional dimensions associated to quantum properties of a physical object, such as a photon and/or an atom. A qubit can represent both a state memory and a state of entanglement in a system. A quantum computation may be performed by initializing a system of qubits with a quantum algorithm or process that puts the system into an entangled state.

The qubit, for example, can be described by a quantum state in a two state quantum-mechanical system, which is formally equivalent to a two-dimensional vector space over the complex numbers. One example of a two-state quantum system is a polarization of a single photon: here the two states are vertical polarization and horizontal polarization. In a classical system, a bit would have to be in one state or the other, but quantum mechanics allows the qubit to be in a superposition of both states at the same time, a property which is fundamental to quantum computing. In an example embodiment, the qubit source or generation module alone or in combination with one or more of a quantum agent or a quantum controller can handle the one or more functions related to qubit generation, entanglement, and/or encoding.

By using quantum superposition, or quantum entanglement, and transmitting information in quantum states, a communication system is well suited for detecting eavesdropping. Quantum entanglement is the shared state of two separate particles, such that what happens to one happens to other. More generally, the entanglement process includes creation of a pair of qubits, e.g., photons of light, in a particular, e.g., a single, quantum state. According to quantum entanglement, even if the pair of qubits are separated and transported to remote destinations, e.g., in opposite directions, they retain in an entangled state, suggesting a quantum connection. According to the quantum connection, any change in the quantum state of one photon will instantaneously and irreversibly change the state of the other one in a predictable way, despite an arbitrary separation distance. Accordingly, it can be said that the quantum state is teleported from one node to another.

Such quantum teleportation requires first establishing separation of a pair of entangled photons between two nodes, e.g., network element 154 (node A) and network element 156 (node B). In one or more embodiments as a prerequisite for quantum teleportation, an entangled pair of photons is generated or otherwise created, e.g., at an entanglement source or generator. In some embodiments, each of nodes A and B receives a respective entangled photon or qubit of the entangled pair, e.g., via any of the example quantum entanglement architectures disclosed herein. Node A, a source in this example, permits its entangled photon to interact with a "memory qubit" that holds data intended for transmission from node A to node B. This interaction changes the state of node A's photon, and through quantum entanglement, while also simultaneously changing the state of node B's photon too. In effect, this process "teleports" the information obtained from A's memory qubit from node A to node B, via the shared entangled photon pair.

The illustrative communications network 100, includes a first quantum enabled node (QEN) 160a and a second quantum enabled node 160b, and a quantum source (QS) 162. The first QEN 160a is associated with the first NE 154 (node A); whereas, the second QEN 160b is associated with the second NE 156 (node B). The QENs 160a, 160b, generally 160, are adapted to process quantum entangled objects, such as entangled photons. The quantum source 162 generates an entangled pair, e.g., an entangled photon pair, and distributes one of the entangled photons to the first QEN 160a via a first quantum channel, and a second one of the entangled photons to the second QEN 160b. Once distributed in this manner, each of the QENs 160a, 160b share quantum entanglement by way of the shared pair of entangled photons. In physically realizable systems, transportation of an entangled object, such as an entangled photon, may be subject to limitations, such as decay, noise, time delay. Depending upon a physical separation of, and/or a network configuration between the end nodes, i.e., nodes A and B, one or more additional quantum entangled objects, e.g., entangled photon pairs, may be utilized to extend entanglement, e.g., through a process known as entanglement swapping. Quantum processing can include, without limitation, one or more of receiving a qubit, storing a qubit, and performing a measurement on a received and/or stored qubit, e.g., to obtain quantum information, such as a quantum state.

In at least some applications, quantum processing, e.g., quantum teleportation, also includes a sharing of a quantum measurement result between the QENs 160*a*, 160*b*. For example, if the first QEN 160*a* performs a measurement to impress information onto its shared qubit, the measurement result obtained at the first QEN 160*a* can be transmitted to the second QEN 160*b* via a classical communication channel, e.g., according to techniques and/or components that establish a communication channel without using entanglement. Such a transfer of the measurement result allows the second QEN 160*b* to perform an independent measurement on its shared quibit, to confirm that its measurement result is consistent with the result shared via the classical communications channel, signifying a quantum teleportation of information from the first QEN 160*a* to the second QEN 160*b*. The classical communication channel can include one or more of the various communications supported by the communications network 125. Although the example QENs 160 are illustrated as being provided in association with the NEs 154, 156 of the communication network, it is envisioned that one or more of the QENs 160 can likewise be included at any one or more of the broadband access 110, the voice access 130, the wireless access 120 and the media access 140 elements. Additionally, in at least some embodiments, the quantum source 162 can be collocated with a source QEN 160*a*, such that a separate quantum channel would be unnecessary as one of a generated pair of entangled objects would already be present at the source QEN 160*a*.

A long-distance entanglement distribution can be adapted to address or otherwise overcome challenges resulting from a decay of any realizable entanglement distribution rate as a function of the distance. As mentioned above, Einstein-Podolsky-Rosen (EPR) is a building block of entanglement-based and entanglement-assisted quantum communication protocols. A prior shared EPR pair and an authenticated classical channel allow two distant users to share information, e.g., a secret key. The example network architecture provides at least one centralized EPR source that creates entangled states by the process of spontaneous parametric down-conversion (SPDC) then routes the states to users in different access networks.

Figure 2A:
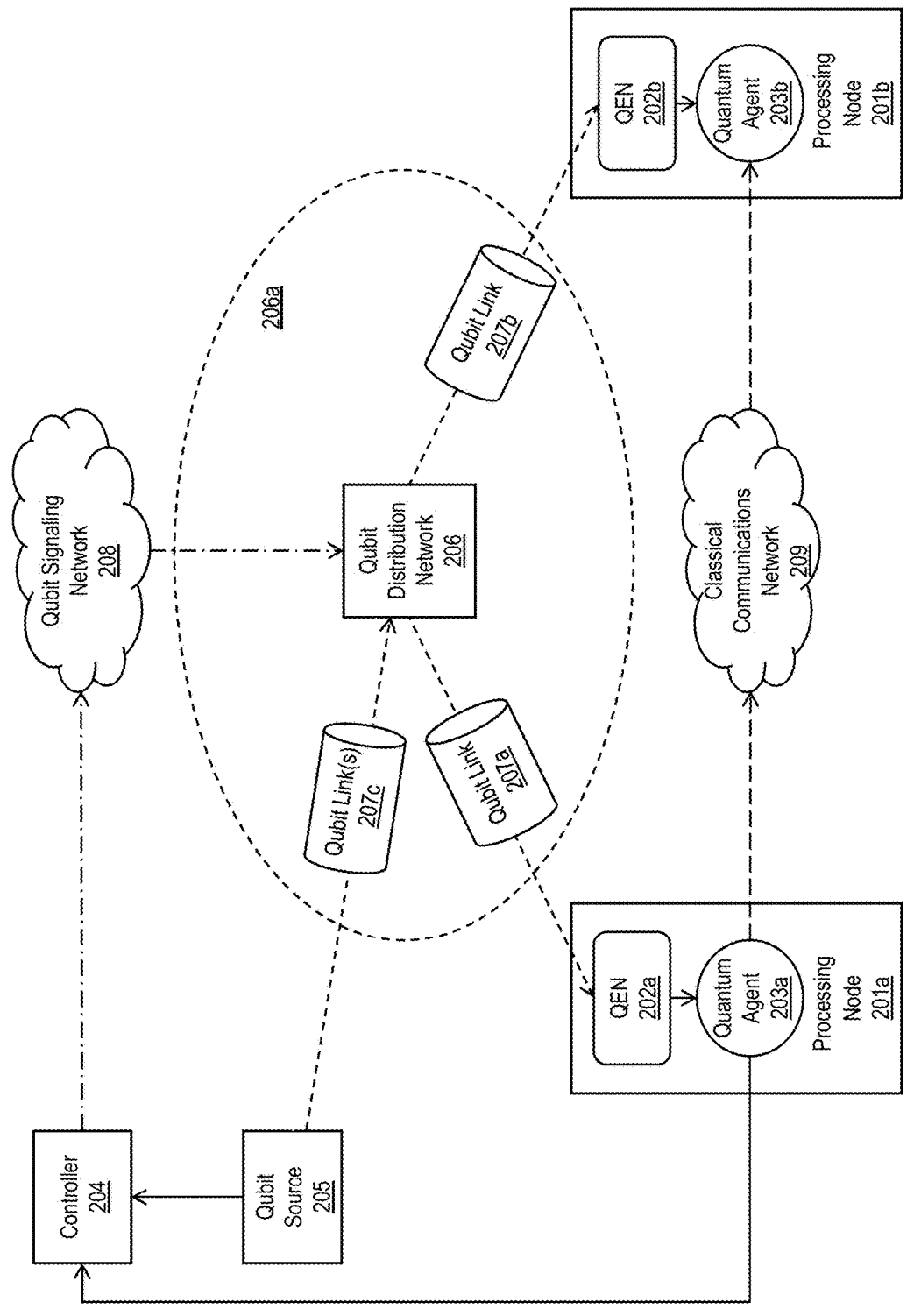
FIG. 2A is a block diagram illustrating an example, non-limiting embodiment of a quantum entanglement distribution system functioning within the communication network of FIG. 1 in accordance with various aspects described herein.

FIG. 2A is a block diagram illustrating an example, non-limiting embodiment of a quantum entanglement distribution system 200 functioning within the communication network of FIG. 1 in accordance with various aspects described herein. The system 200 includes two processing nodes, referred to herein as a first processing node 201*a* and a second processing node 201*b*. The first processing node 201*a* includes a first quantum enabled node 202*a* and a first quantum agent 203*a*. Likewise, the second processing node 201*b* includes a second quantum enabled node 202*b* and a second quantum agent 203*b*. In at least some embodiments, information can be shared or otherwise exchanged between the two processing nodes 201*a*, 201*b*, generally 201, through a process that relies at least in part upon a so-called entanglement, or quantum entanglement between the processing nodes 201.

In one or more embodiments, quantum entanglement occurs when two distinct physical systems, e.g., the two processing nodes 201, are attributed non-separable quantum states. The quantum states can be established by generating entangled objects at one location, physically separating the entangled objects and transporting one or both of the entangled objects to other locations to effectively share portions of the entangled objects. A two-level quantum system, is referred to as a quantum bit or qubit. For example, an entangled pair of qubits can be generated, a first qubit of an entangled pair of qubits can be provided to the first processing node 201*a*, and a second qubit of the entangled pair of qubits can be provide to the second processing node 201*b*. Accordingly, the two processing nodes 201, may share halves of two qubit entangled states. In such an entangled state, a special interrelationship exists between the nodes 201, in which measuring an object, e.g., the first qubit of the entangled pair, instantly influences the other, e.g., the second qubit of the entangled pair, even if the two are completely isolated and/or separated from one another. Thus, if one of the entangled qubits is measured in any basis to have a definite physical state, such as a polarization of a photon, then the state of the other must be exactly complementary to this polarization.

According to the illustrative embodiment, the system 200 further includes a quantum entanglement source 205, adapted to generate a quantum entangled group of objects, e.g., a qubit and/or a group of qubits. One or more members of the quantum entangled group of objects can be physically transported to one or more target locations via an entanglement distribution system 206*a*. According to the illustrative example, the entanglement distribution system 206*a* includes one or more quantum channels, or links 207*a*, 207*b*, 207*c*, adapted to transport one or more of the members of the quantum entangled group of objects. It is understood that the entanglement distribution system 206*a* can include at least one configurable element, such as a switch and/or a router adapted to selectively control the distribution of the quantum entangled group of objects. According to the illustrative example, the entanglement distribution system 206*a* includes an entanglement distribution network 206.

In some embodiments, the entanglement distribution network 206 includes a fiber optic system. Example fiber optic systems include, without limitation, direct, point-to-point fiber optic links, e.g., between the quantum enabled nodes 202*a*, 202*b* and/or between the quantum entanglement source 205 and one or more of the quantum enabled nodes 202*a*, 202*b*. Alternatively or in addition, the entanglement distribution network 206 includes one or more of a fiber ring network and a fiber mesh network. Distribution and/or routing of entangled photons can include one or more of add/drop multiplexers, wavelength division multiplexers, switches, e.g., cross bar switches, optical routers and the like. In at least some embodiments, the fiber optic network includes, so-called, deep fiber that extends at or at least relatively close to endpoint destinations, e.g., households, apartment buildings, business, and the like. It is understood that existing fiber optic networks and/or links can be used in whole or in part to facilitate distribution of entangled photons according to the disclosed embodiments.

In general, the entanglement distribution network 206 facilitates distribution of one or more qubits from a qubit source, e.g., an independent qubit source 205, to one or more of the quantum enabled nodes 202*a*, 202*b* of the communications nodes 201. The entanglement distribution network 206 can include one or more switches, routers, and/or other configurable network elements adapted to establish quantum channel links. Depending upon a configuration of the entanglement distribution network 206, one or more of the quantum entangled group of objects can be selectively directed to one or more locations, such as the first processing node 201a, the second processing node 201b, or both the first and second processing nodes 201a, 201b, via one or more of the quantum channels 207a, 207b, 207c, generally 207.

The illustrative embodiment of the quantum entanglement distribution system 200 includes an entanglement distribution controller 204. The controller 204 can generate and/or apply logic, and/or policies, and/or algorithms and the like, to facilitate entanglement distribution, by directing one or more members of the quantum entangled group of objects to predetermined locations, e.g., processing nodes 201, or more particularly, quantum enabled nodes 202a, 202b, as detailed further below. For example, the controller 204 may select one or more quantum communication links and/or configuration(s) of one or more configurable elements of a quantum communication link or channel. In at least some embodiments, the controller 204 determines a suitable configuration of the configurable entanglement distribution network 206, and conveys one or more control signals to the configurable entanglement distribution network 206. The control signals cause the entanglement distribution network 206 to configure, or reconfigure itself facilitate transport of the members of the quantum entangled group of objects to their predetermined or intended locations. The control signals can be directed from the controller 204 to the configurable entanglement distribution network 206 via a control or signaling channel, such as a quantum entanglement signaling channel or network 208.

It is envisioned that in at least some embodiments, the quantum entanglement signaling channel or network 208 comprises one or more classical communications channels, i.e., not specifically employing quantum entanglement, quantum processing and/or quantum teleportation. However, it is further envisioned that in at least some embodiments, the quantum entanglement signaling channel or network 208 can employ a quantum channel, e.g., a quantum link 207. For example, control and/or configuration information for a second quantum link may be exchanged between the controller 204 and the configurable entanglement distribution network 206 via quantum entanglement over a first, pre-established quantum link.

In more detail, the first quantum enabled node 202a is in communication with the first quantum agent 203a. Likewise, the second quantum enabled node 202b is in communication with the second quantum agent 203b. The first and second quantum agents 203a, 203b can be in communication with each other via a classical communications channel or network 209, i.e., not relying upon qubits or entanglement sharing. At least one of the quantum agents 203, e.g., the first quantum agent 203a, is in communication with the controller 204. At least one of the first or second quantum agents 203a, 203b is in communication with the controller 204. In at least some embodiments, communications between the quantum agent 203 and the controller 204 may be accommodated via a classical communications channel or network, i.e., not relying upon qubits or entanglement sharing.

The controller 204 can be implemented as a standalone processing device, such as a dedicated server. Alternatively or in addition, the controller 204, without limitation, can be combined with or otherwise hosted on another system, such as a telecommunications system controller, a terrestrial network controller, a fiber optic network controller, a cable network controller, a wireless link controller, a satellite link controller, and the like. The controller 204 may be combined with or otherwise collocated with the qubit source 205. Alternatively, the controller 204 may be physically separate from the qubit source 205, and in at least some embodiments, at a remote location. When remote the controller 204 can be in communication with the qubit source 205 via a telecommunications network, a terrestrial packet switched network, a fiber optic network, a cable network, a wireless network, a satellite network controller, and the like.

In some embodiments, one or more of the processing nodes 201 are communications nodes, e.g., sharing quantum entanglement and exchanging information with one or more other processing nodes 201, via quantum teleportation. According to quantum communications, entangled photons are used to transfer information between nodes, in which a source node or sender holds half of the entangled photons, while the destination node or receiver holds the other half. Communication can be made possible by manipulation of the photons at one of the source or destination, resulting in an instantaneous change in the corresponding photons.

Alternatively or in addition, the processing nodes 201 can include quantum processors adapted to store and/or otherwise manipulate or process qubits. Quantum processors rely on quantum bits, or qubits, instead of classical bits. Since qubits can exist in multiple states, e.g., a '0' and a '1,' known as superposition, they can support performance of multiple calculations at once, while traditional bits are confined to only a 0 or a 1, limiting them to one calculation at a time. When one quantum processor changes the states of its photons, the corresponding entangled photons are changed in the other quantum processor, thus transferring the necessary qubits.

The qubit source 205 may include a microscopic system, such as an atom, e.g., atomic nuclei, in which entanglement is shared via a nuclear spin, or a photo in which entanglement may be shared by one or more of polarized or orbital angular momentum. Qubits that utilize photons can be carried or otherwise transported along optical channels. For example, one or more of the quantum channels or links 207 that convey polarized photons can include optical fiber, free space, or a combination of optical fiber and free-space optical links. A processing node 201 adapted for processing photon-based qubits may include a photon detector, e.g., a single photon detector, a polarization detector, a quantum storage element to store qubits received from the quantum entanglement source 205.

The quantum agent 203 can include a processor, such as a microprocessor adapted to execute a preprogrammed instruction set to interact with the quantum enabled node 202 to facilitate generation of entanglement between itself and a quantum agent of another node. Facilitating generation of entanglement can include one or more of: (i) identifying a source processing node 201a and/or a destination node 201b, and possibly an intervening node, such as a quantum repeater to identify a particular quantum channel; (ii) requesting generation of and/or dissemination of entangled qubits among processing nodes 201 of the particular quantum channel; (iii) performing measurements on at least one of a pair of entangled qubits shared via at least a portion of the particular quantum channel; (iv) determining entangled state information, such as a state of at least one of the shared pair of entangled qubits; and (v) sharing the determined state information with the destination node 201.

A local QA 203a can be preconfigured with a list of QENs 202, such as a list of QENs 202 accessible by the entanglement distribution network 206. It is understood that in at least some applications, one or more of the QENs 202 are preconfigured with connectivity tables. Alternatively or in addition, the QA 203a can be preconfigured, e.g., preprogrammed, with logic and/or policies adapted to implement, control and/or otherwise manage quantum entanglement distribution. For example, the QA 203a can receive a request for processing at one or more processing nodes 201, and determine whether the processing should employ quantum entanglement, e.g., by establishing a quantum channel for transporting quantum entangled objects. The request for processing can include a request for communications between processing nodes 201, a request for quantum encryption of information at one or more of the processing nodes 201, and/or to communications between processing nodes 201. Determining whether quantum entanglement is appropriate, necessary and/or otherwise required can be based on one or more of various conditions, such as an imposed and/or requested security level of processed information, a location of one or more of the processing nodes 201, e.g., in a secure facility, a sender and/or recipient identity, a level of subscription, and the like.

Alternatively or in addition, Determining whether quantum entanglement is appropriate, necessary and/or otherwise required can be based on a quantity of data to be processed, a processing timing requirement, channel conditions, channel capacity of the classical communications network 209 and/or the entanglement distribution network 206, and/or any one or more of the quantum links 207. Alternatively or in addition, the determining whether quantum entanglement is appropriate, necessary and/or otherwise required can be based on quantum source 205 availability and/or capacity, success and/or failures of prior attempts to establish entanglement, time of day, network routing path geometry, etc. It is further understood that determining whether quantum entanglement is appropriate, necessary and/or otherwise required, including in any of the foregoing examples, can depend upon a threshold value, e.g., a security level threshold, a time delay threshold, a channel capacity threshold, a link length and or number of nodes threshold, and the like.

The QA 203a, having received a request for communication between two nodes 201, and having determined that quantum entanglement should be applied, determines a configuration of a quantum channel for transporting one or more entangled objects, e.g., photons. The configuration can be determined according to predetermined parameters, such as maximum allowable link distances to ensure reliable transport of the quantum entangled photon(s) to intended destination(s). Preferences can be established to minimize link distances and/or numbers of intermediate nodes. Configurations can be determined according to availability of QENs 202 at a source, a destination and/or any intermediate nodes. For systems in which there may be more than one quantum source 205, configuration can include identification of the one or more sources 205 and/or link selection and/or network configurations between the one or more sources 205, the source node, the destination node and/or any intervening nodes.

In at least some configurations, quantum repeaters may be available. To the extent they are, configurations may be selected to employ the available quantum repeaters, and/or to avoid them when possible, and/or to minimize their use in order to establish and/or maintain a relatively low complexity and/or high reliability of the quantum distribution.

Figure 2B:
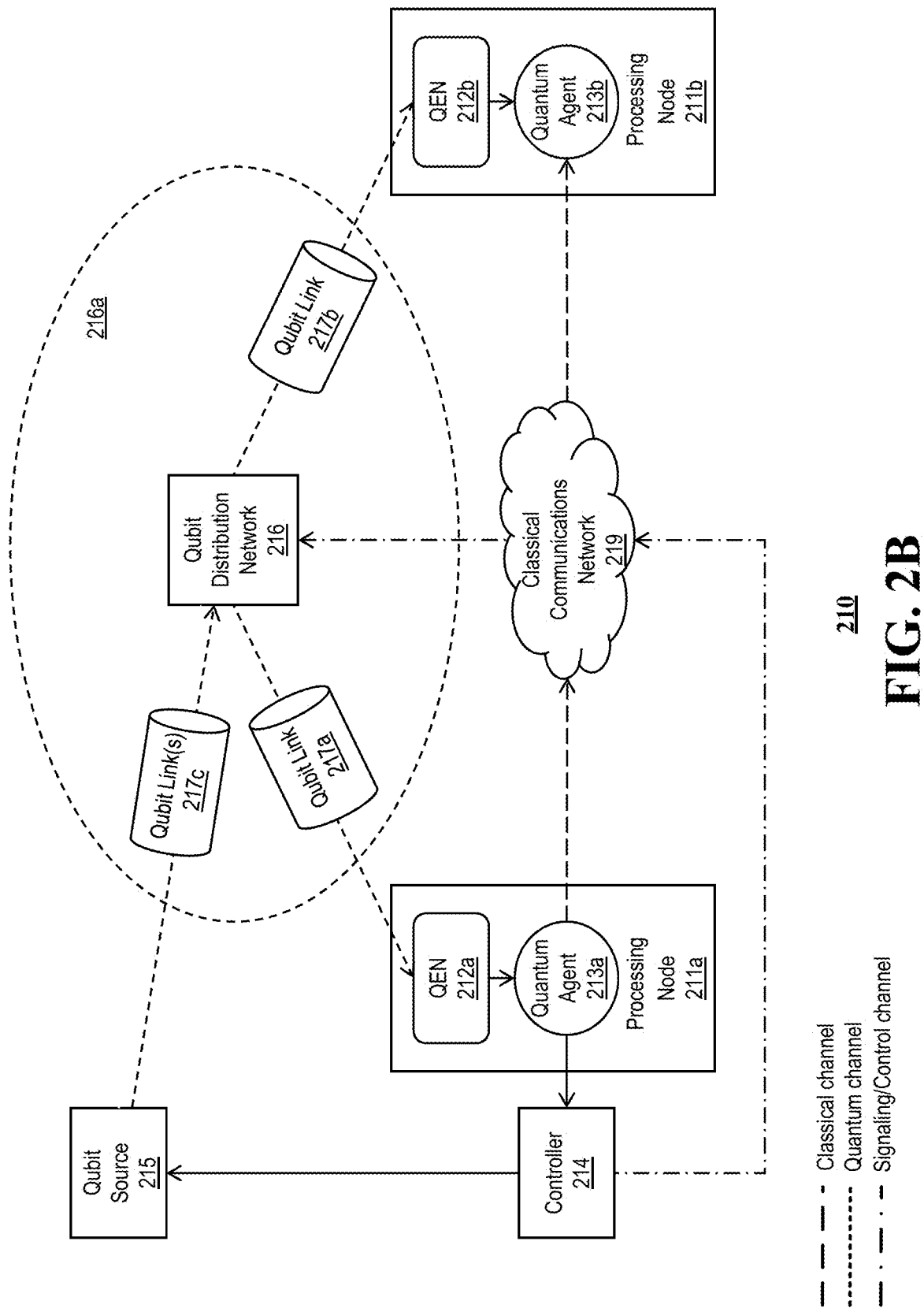
FIG. 2B is a block diagram illustrating an example, non-limiting embodiment of another quantum entanglement distribution system functioning within the communication network of FIG. 1 in accordance with various aspects described herein.

FIG. 2B is a block diagram illustrating an example, non-limiting embodiment of another quantum entanglement distribution system 210 functioning within the communication network of FIG. 1 in accordance with various aspects described herein. The system 210 includes a first processing node 211a and a second processing node 211b. The first processing node 211a includes a first QEN 212a and a first QA 213a. Likewise, the second processing node 211b includes a second QEN 212b and a second QA 213b. The system 210 further includes a quantum entanglement source 215, adapted to generate a quantum entangled group of objects, e.g., a qubit and/or a group of qubits. One or more members of the quantum entangled group of objects can be physically transported to one or more target locations via an entanglement distribution system 216a. According to the illustrative example, the entanglement distribution system 216a includes one or more quantum channels, or links 217a, 217b, 217c, adapted to transport one or more of the members of the quantum entangled group of objects. It is understood that the entanglement distribution system 216a can include at least one configurable element, such as a switch and/or a router adapted to selectively control the distribution of the quantum entangled group of objects. According to the illustrative example, the entanglement distribution system 216a includes an entanglement distribution network 216.

In general, the entanglement distribution network 216 facilitates distribution of one or more qubits from the qubit source 215, to one or more of the quantum enabled nodes 212a, 212b of the communications nodes 211. The entanglement distribution network 216 can include one or more switches, routers, and/or other configurable network elements adapted to establish quantum channel links. Depending upon a configuration of the entanglement distribution network 216, one or more of the quantum entangled group of objects can be selectively directed to one or more locations, such as the first processing node 211a, the second processing node 211b, or both the first and second processing nodes 211a, 211b, via one or more of the quantum channels 217a, 217b, 217c, generally 217.

The first and second quantum agents 213a, 213b can be in communication with each other via a classical communications channel or network 219, i.e., not relying upon qubits or entanglement sharing. At least one of the first or second quantum agents 213a, 213b is in communication with the controller 214. In at least some embodiments, communications between the quantum agent 213 and the controller 214 may be accommodated via a classical communications channel 219 or network, i.e., not relying upon qubits or entanglement sharing. According to the illustrative embodiment, the controller 214 can communicate with the quantum distribution network 216 via the classical communications network 219, e.g., foregoing the need for a separate and/or independent quantum channel signaling network.

Any of the elements, such as the QAs, 213, the controller 214, and/or the QENs 212 can be preconfigured with a list of QENs 212, such as a list of QENs 212 accessible by the quantum distribution network 216, connectivity tables, logic and/or policies adapted to implement, control and/or otherwise manage quantum entanglement distribution, e.g., as disclosed in reference to FIG. 2A.

Figure 2C:
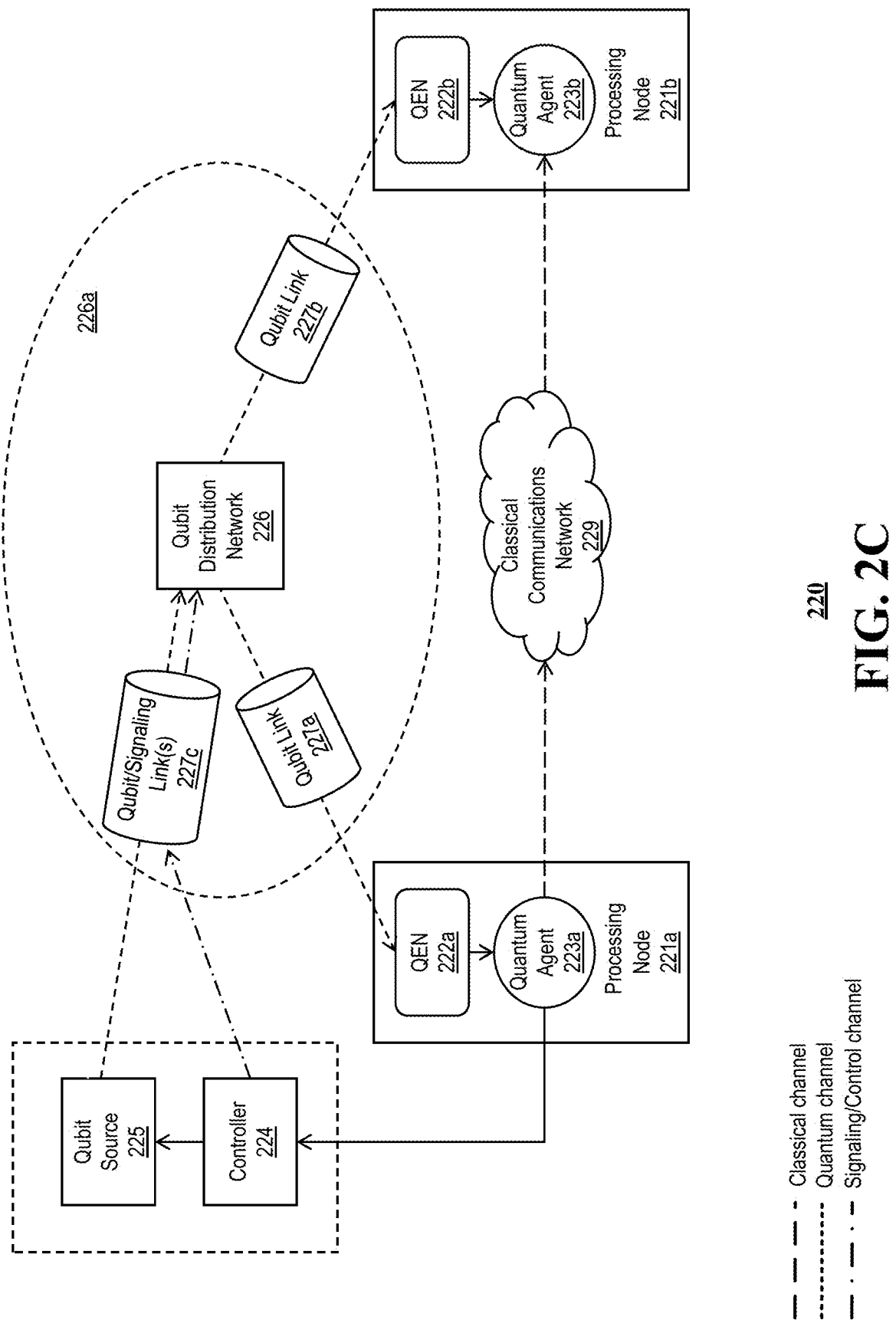
FIG. 2C is a block diagram illustrating an example, non-limiting embodiment of another quantum entanglement distribution system functioning within the communication network of FIG. 1 in accordance with various aspects described herein.

FIG. 2C is a block diagram illustrating an example, non-limiting embodiment of another quantum entanglement distribution system functioning within the communication network of FIG. 1 in accordance with various aspects described herein. The system 220 includes a first processing node 221a and a second processing node 221b. The first processing node 221a includes a first QEN 222a and a first QA 223a. Likewise, the second processing node 221b includes a second QEN 222b and a second QA 223b. The system 220 further includes a quantum entanglement source 225, adapted to generate a quantum entangled group of objects, e.g., a qubit and/or a group of qubits. One or more members of the quantum entangled group of objects can be physically transported to one or more target locations via an entanglement distribution system 226a. According to the illustrative example, the entanglement distribution system 226a includes one or more quantum channels, or links 227a, 227b, 227c, adapted to transport one or more of the members of the quantum entangled group of objects. It is understood that the entanglement distribution system 226a can include at least one configurable element, such as a switch and/or a router adapted to selectively control the distribution of the quantum entangled group of objects. According to the illustrative example, the entanglement distribution system 226a includes an entanglement distribution network 226.

In general, the entanglement distribution network 226 facilitates distribution of one or more qubits from the qubit source 225, to one or more of the quantum enabled nodes 222a, 222b of the communications nodes 221. The entanglement distribution network 226 can include one or more switches, routers, and/or other configurable network elements adapted to establish quantum channel links. Depending upon a configuration of the entanglement distribution network 226, one or more of the quantum entangled group of objects can be selectively directed to one or more locations, such as the first processing node 221a, the second processing node 221b, or both the first and second processing nodes 221a, 221b, via one or more of the quantum channels 227a, 227b, 227c, generally 227.

The first and second quantum agents 223a, 223b can be in communication with each other via a classical communications channel or network 229, i.e., not relying upon qubits or entanglement sharing. At least one of the first or second quantum agents 223a, 223b is in communication with the controller 224. In at least some embodiments, communications between the quantum agent 223 and the controller 224 may be accommodated via a classical communications channel or network, i.e., not relying upon qubits or entanglement sharing. According to the illustrative embodiment, the controller 224 can communicate with the quantum distribution network 226 via the quantum links 227, e.g., also foregoing the need for a separate and/or independent quantum channel signaling network. For applications in which the quantum links include fiber optic links, the signaling information can be communicated over the quantum link 227 via a classical communication channel, e.g., independent from transport of a quantum entangled photon over the same link.

Any of the elements, such as the QAs, 223, the controller 224, and/or the QENs 222 can be preconfigured with a list of QENs 222, such as a list of QENs 222 accessible by the quantum distribution network 226, connectivity tables, logic and/or policies adapted to implement, control and/or otherwise manage quantum entanglement distribution, e.g., as disclosed in reference to FIG. 2A.

Figure 2D:
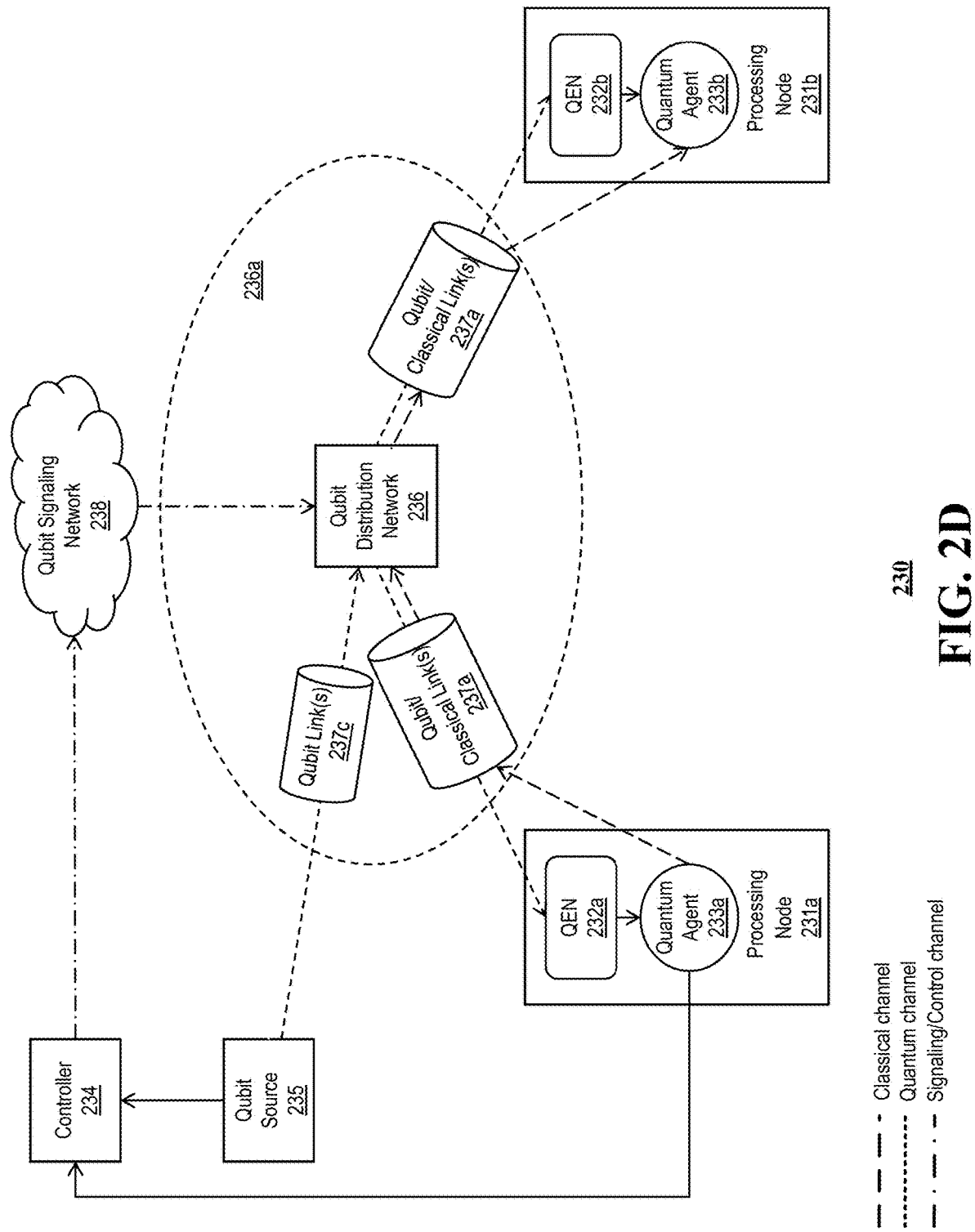
FIG. 2D is a block diagram illustrating an example, non-limiting embodiment of another quantum entanglement distribution system functioning within the communication network of FIG. 1 in accordance with various aspects described herein.

FIG. 2D is a block diagram illustrating an example, non-limiting embodiment of another quantum entanglement distribution system functioning within the communication network of FIG. 1 in accordance with various aspects described herein. The system 230 includes a first processing node 231a and a second processing node 231b. The first processing node 231a includes a first QEN 232a and a first QA 233a. Likewise, the second processing node 231b includes a second QEN 232b and a second QA 233b. The system 230 further includes a quantum entanglement source 235, adapted to generate a quantum entangled group of objects, e.g., a qubit and/or a group of qubits. One or more members of the quantum entangled group of objects can be physically transported to one or more target locations via an entanglement distribution system 236a. According to the illustrative example, the entanglement distribution system 236a includes one or more quantum channels, or links 237a, 237b, 237c, adapted to transport one or more of the members of the quantum entangled group of objects. It is understood that the entanglement distribution system 236a can include at least one configurable element, such as a switch and/or a router adapted to selectively control the distribution of the quantum entangled group of objects. According to the illustrative example, the entanglement distribution system 236a includes an entanglement distribution network 236.

In general, the entanglement distribution network 236 facilitates distribution of one or more qubits from the qubit source 235, to one or more of the quantum enabled nodes 232a, 232b of the communications nodes 231. The entanglement distribution network 236 can include one or more switches, routers, and/or other configurable network elements adapted to establish quantum channel links. Depending upon a configuration of the entanglement distribution network 236, one or more of the quantum entangled group of objects can be selectively directed to one or more locations, such as the first processing node 231a, the second processing node 231b, or both the first and second processing nodes 231a, 231b, via one or more of the quantum channels 237a, 237b, 237c, generally 237.

According to the illustrative embodiment, the QAs 233 can exchange quantum state information via a classical channel supported over one or more of the quantum links 237, e.g., also foregoing the need for a separate and/or independent classical communications channel. For applications in which the quantum links include fiber optic links, the quantum state information can be communicated over the quantum link 237 via a classical communication channel, e.g., independent from transport of a quantum entangled photon over the same link. The signaling information can be communicated over a signaling network 238, via a classical communication channel, e.g., independent from transport of a quantum entangled photon and/or the classical communications between QAs 233 over the quantum channel 237.

Any of the elements, such as the QAs, 233, the controller 234, and/or the QENs 232 can be preconfigured with a list of QENs 232, such as a list of QENs 232 accessible by the quantum distribution network 226, connectivity tables, logic and/or policies adapted to implement, control and/or otherwise manage quantum entanglement distribution, e.g., as disclosed in reference to FIG. 2A.

Figure 2E:
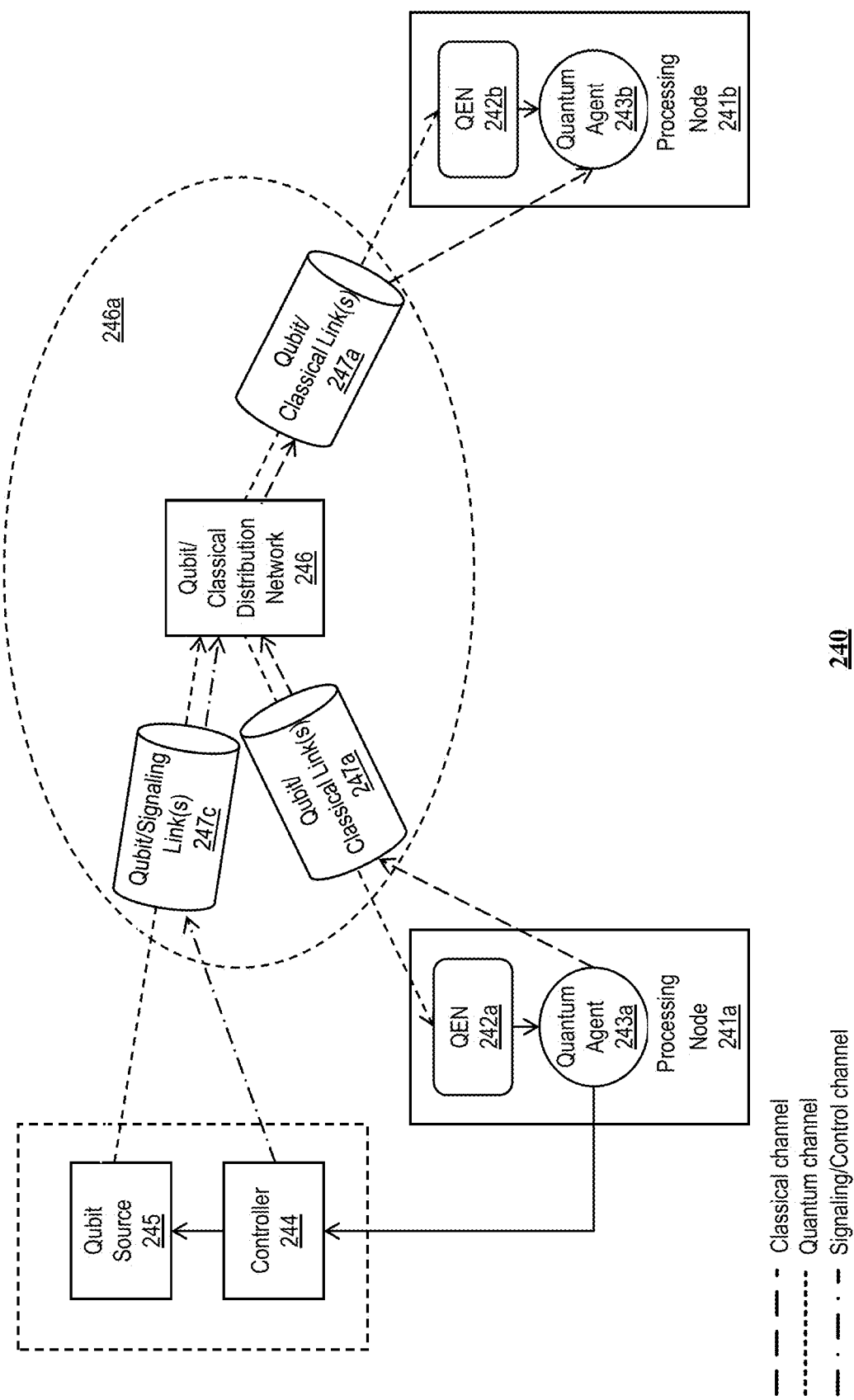
FIG. 2E is a block diagram illustrating an example, non-limiting embodiment of another quantum entanglement distribution system functioning within the communication network of FIG. 1 in accordance with various aspects described herein.

FIG. 2E is a block diagram illustrating an example, non-limiting embodiment of another quantum entanglement distribution system functioning within the communication network of FIG. 1 in accordance with various aspects described herein. The system 240 includes a first processing node 241a and a second processing node 241b. The first processing node 241a includes a first QEN 242a and a first QA 243a. Likewise, the second processing node 241b includes a second QEN 242b and a second QA 243b. The system 240 further includes a quantum entanglement source 245, adapted to generate a quantum entangled group of objects, e.g., a qubit and/or a group of qubits. One or more members of the quantum entangled group of objects can be physically transported to one or more target locations via an entanglement distribution system 246a. According to the illustrative example, the entanglement distribution system 246a includes one or more quantum channels, or links 247a, 247b, 247c, adapted to transport one or more of the members of the quantum entangled group of objects. It is understood that the entanglement distribution system 246a can include at least one configurable element, such as a switch and/or a router adapted to selectively control the distribution of the quantum entangled group of objects. According to the illustrative example, the entanglement distribution system 246a includes an entanglement distribution network 246.

In general, the entanglement distribution network 246 facilitates distribution of one or more qubits from the qubit source 245, to one or more of the quantum enabled nodes 242a, 242b of the communications nodes 241. The entanglement distribution network 246 can include one or more switches, routers, and/or other configurable network elements adapted to establish quantum channel links. Depending upon a configuration of the entanglement distribution network 246, one or more of the quantum entangled group of objects can be selectively directed to one or more locations, such as the first processing node 241a, the second processing node 241b, or both the first and second processing nodes 241a, 241b, via one or more of the quantum channels 247a, 247b, 247c, generally 247.

According to the illustrative embodiment, the QAs 243 can exchange quantum state information via a classical channel over one or more of the quantum links 247, e.g., also foregoing the need for a separate and/or independent classical communications channel. For applications in which the quantum links include fiber optic links, the quantum state information can be communicated over the quantum link 247 via a classical communication channel, e.g., independent from transport of a quantum entangled photon over the same link. Likewise, the controller 244 can communicate with the quantum distribution network 246 via a classical channel over the quantum link 247, e.g., foregoing the need for a separate and/or independent quantum channel signaling network.

Any of the elements, such as the QAs, 243, the controller 244, and/or the QENs 242 can be preconfigured with a list of QENs 242, such as a list of QENs 242 accessible by the quantum distribution network 246, connectivity tables, logic and/or policies adapted to implement, control and/or otherwise manage quantum entanglement distribution, e.g., as disclosed in reference to FIG. 2A.

Figure 2F:
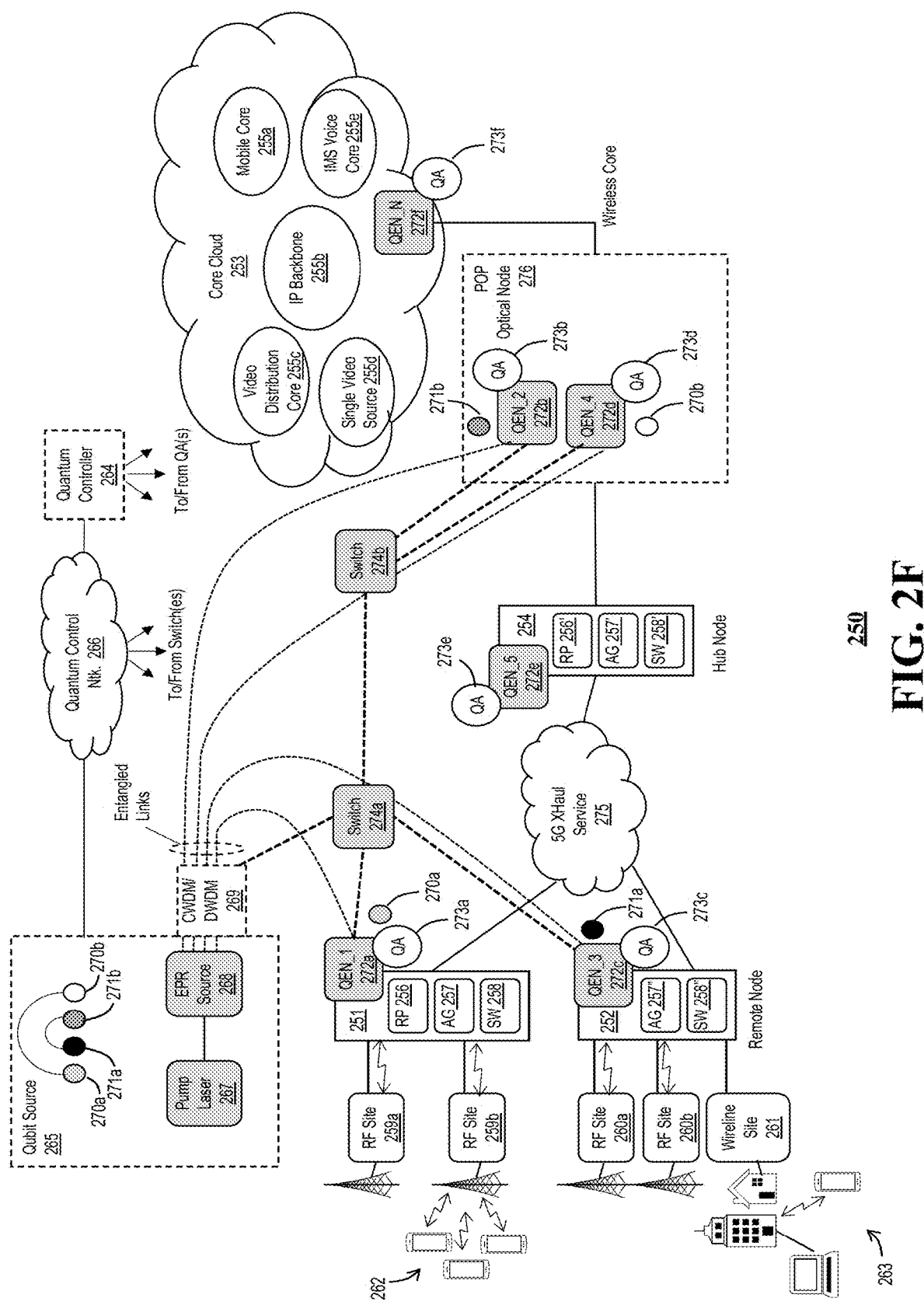
FIG. 2F is a block diagram illustrating an example, non-limiting embodiment of yet another quantum entanglement distribution system functioning within the communication network of FIG. 1 in accordance with various aspects described herein.

FIG. 2F is a block diagram illustrating an example, non-limiting embodiment of yet another quantum entanglement distribution system 250 functioning within the communication network of FIG. 1 in accordance with various aspects described herein. The system 250 includes a first communication node 251 and a second communication node 252. The communication nodes 251, 252 are in communication with a core network, e.g., a mobility core network, or core cloud 253, via a hub communication node 254. The core cloud 253 can include one or more components grouped according to their supported functionalities, such as a mobile core 255a, an IP backbone 255b, a video distribution core 255c, one or more single video sources 255d, an IMS voice core 255e, etc. The communication nodes 251, 252 and hub node 254 can include one or more of a radio processing (RP) subsystem, 256, 256', an augmentation subsystem 257, 257', 257'' and a switch subsystem 258, 258', 258''.

The first communication node 251 is in communication with one or more remote radio frequency (RF) sites 259a, 259b, which, in turn, can be in communication with one or more wireless, e.g., mobile communication devices 262, such as mobile phones, tablet devices, laptop devices, machines, e.g., according to machine-to-machine (M2M), or machine-type communications in an Internet of Things (IoT) application, and the like, via radio access networks (RANs), e.g., according to 3G, 4G 5G standards/applications, and the like, wireless access points, e.g., according to wireless network standards/applications, such as IEEE 802.11 wireless networks. Likewise, the second communication node 252 is in communication with one or more remote radio frequency (RF) sites 260a, 260b, which, in turn, can be in communication with one or more wireless, e.g., mobile communication devices via radio access networks (RANs). According to the illustrative example, the second communication node 252 is in further communication with a wireline site 261, such as a household, a business, a public facility, and so on, which can be in communication with one or more communication devices 263, including any of the example devices disclosed herein or otherwise known to those skilled in the art. The wireline site 261 can be in communication with the second communication node 252 via any suitable communication network, such as cable, optical fiber, twisted pair, e.g., DSL.

The quantum entanglement distribution system 250 includes a quantum controller 264, a quantum source, e.g., qubit source 265, and a quantum control network 266. The quantum controller is adapted to configure one or more of the quantum control network 266 and the quantum source 265 to generate quantum entangled objects, e.g., photons and to distribute them to one or more communication nodes 251, 253, 254 via quantum channels, all responsive to a request to establish entanglement between at least two predetermined communication nodes 251, 252, 254.

Any of the elements, such as the QAs, 253, the controller 254, and/or the QENs 272 can be preconfigured with a list of QENs 272, such as a list of QENs 272 accessible by the quantum distribution network, connectivity tables, logic and/or policies adapted to implement, control and/or otherwise manage quantum entanglement distribution, e.g., as disclosed in reference to FIG. 2A.

According to the illustrative example that uses photons as entanglement objects, the quantum source 265 includes a laser, e.g., a pump laser 267, and a qubit source, e.g., an EPR source 268. The pump laser 267 and the EPR source 268 cooperate, at a request of the quantum controller 264, to generate at least one quantum entangled pair of photons. According to the illustrative example, a first entangled pair includes a first entangled photon 270a and a second entangled photon 270b. Likewise, a second entangled pair of photons includes a first entangled photon 271a and a second entangled photon 271b.

In at least some embodiments, the system 250 includes a multiplexer, such as a wavelength division multiplexer (WDM). Example WDMs include coarse WDM (CWDM), e.g., with channel spacing of about 20 nm, and dense WDM (DWDM), e.g., with a finer channel spacing. Data signals, e.g., entangled photons generated according to different wavelengths, can be combined together into a multi-wavelength optical signal using such an optical multiplexer, for transmission over a single fiber. Accordingly, a single optical fiber can be adapted to simultaneously support multiple quantum channel, each operating at a different wavelength. If the first entangled pair of photons 270a, 270b, generally 270, is generated according to a first wavelength and the second entangled pair of photons 271a, 271b, generally 271 is generated according to a second wavelength different from the first, then both pair 270, 271 may be distributed simultaneously along the same quantum channel or fiber, according to an optical multiplexing of the WDM 269.

The first communication node 251 includes a first quantum enabled node (QEN) 272a. Likewise, the second and third communication nodes 252, 254 include respective QENs 272c, 272e. Other communication nodes, such as may be contained in the core cloud 253 and/or in one or more point-of-presence (POP) optical nodes 276, also include QENs 272b, 272c, 272e. According to the illustrative embodiment, the POP optical node 276 can include more than one QEN 272b, 272d, to support multiple quantum channels simultaneously. It is understood that in at least some embodiments, the POP optical node 276 can include a WDM (not shown) to facilitate simultaneous quantum channels along a common fiber, operating at different wavelengths.

Each of the QENs 272a, 272b, 272c, 272d, 272e, 272f, generally 272, is associated with a respective quantum agent (QA) 273a, 273b, 273c, 273d, 273e, 273f, generally 273. The QAs 273 are adapted to implement functionality that supports distribution and/or applications involving quantum entanglement, such as entanglement distribution, qubit measurements, qubit storage, quantum teleportation, quantum encryption, quantum computing, and the like. Accordingly, the QAs 273 are in communication with their respective QENs 272. In at least some embodiments, one or more of the QAs 273 are in further communication with one or more of the quantum controller 264, the quantum control network 266, the qubit source 265 and/or one or more other QAs 273. Communications between the QAs 273 and one or more of the other elements 264, 265, 266, 273 can be accomplished via classical communication channels, e.g., using available communication resources, such as those present in the communication nodes 251, 252, 254. According to the illustrative example, one or more of the communication nodes 251, 252, 254 are in communication via a network 275, such as a backhaul network of a mobile carrier service, e.g., a 5G service, a fiber ring, the Internet, or any other public and/or private network alone or in combination.

The quantum entanglement distribution system 250 establishes quantum entanglement distribution for a quantum channel. Like any other network, such as IP network, one or more of the QA nodes 273, the QENs 272 and the EPR node 265 can be pre-provisioned with pre-built logic, including the entanglement distribution tables. In general, for quantum communication applications, two channels are provided between the source and the destination: a quantum link, or quantum channel, and a classical link or classical channel. The quantum channel is adapted to transport entangled photons according to a predetermined destination and along a determined path, without disturbing the quantum information of the transported particles, e.g., photons.

Described below is an example message flow for the illustrative quantum entanglement distribution system 250. Upon receiving an incoming connection request at the first communication node 251, e.g., from a radio interface of the RAN of an RF site 259, a QA 273a associated with the communication node 251 determines that a quantum connection is appropriate, necessary and/or otherwise required for associated traffic with a remote node, e.g., the POP node 276. Based on a pre-determined logic and/or policy, the first QA 273a notifies a default master EPR source node 265 that a qubits generation is required, and that the an entanglement distribution of the entangled qubits is required between a source QEN 202a of the first communication node 251 and a destination QEN of the destination node 276. The EPR node 265 generates the entangled qubits 271a, 271b and sends a qubit 271a of the entangled qubits 271 to the source QEN 272a and a second qubit 272b of the entangled qubit pair 271 to the destination QEN 272b. Although the EPR generation node 265 is illustrated as a separate and independent node, requiring a quantum channel between itself and both endpoint QENs 272a, 272b, it is understood that in at least some embodiments, the EPR generation node 265 can be collocated with the QEN 272a of the source communication node 251. For example, in an initial deployment of this feature, e.g., with a limited number of possible quantum channels or links, such a collocated source can be used in an effort to keep the cost and/or complexity down.

Now the entangled link (that is quantum channel) has been established between the source QEN and the destination QEN. The classical channel could be using the same path or any other path and this could be business as usual. The destination QEN will wait for the data (quantum state status) from the source QEN via the classical channel.

The illustrative architecture of the example quantum entanglement distribution system 250 can be employed in a fiber optic network, such as a, so-called, deep fiber optical network architecture that extends from a centralized network, such as a mobile carrier backbone network, proximate to one or more wireless access points, e.g., to residences, office buildings, public facilities, such as airports, parks, and government buildings, commercial facilities, such as stores, shopping centers and the like, schools and other educational institutions, and so on, for entanglement distribution. For applications including free space optical channels, it is envisioned that the deep-fiber concept can be extend to untethered access points, such as vehicles, e.g., airplanes, trains, ships, trucking, automobiles, satellites, and the like.

According to the present disclosure, a typical telecommunication infrastructure by employing a local QA in each QEN, e.g., off of the (metropolitan) optical fiber network, that manages the interaction with a single source of EPR (qubits generation) node in order to create entangled link between source and destination nodes. Based on the instruction of the QA of the source quantum enabled node, EPR source node creates the entangled qubits (photons) and distributes them among the two quantum enabled remotes nodes interfacing with the fiber ring (such as the deep fiber supporting a RAN (5G). The architecture allows simultaneous transmission of classical and quantum signals for the classical and quantum channels respectively in the fiber network and provides a local QA enabled simple routing mechanism to serve the entire deep fiber vicinity.

Figure 2G:
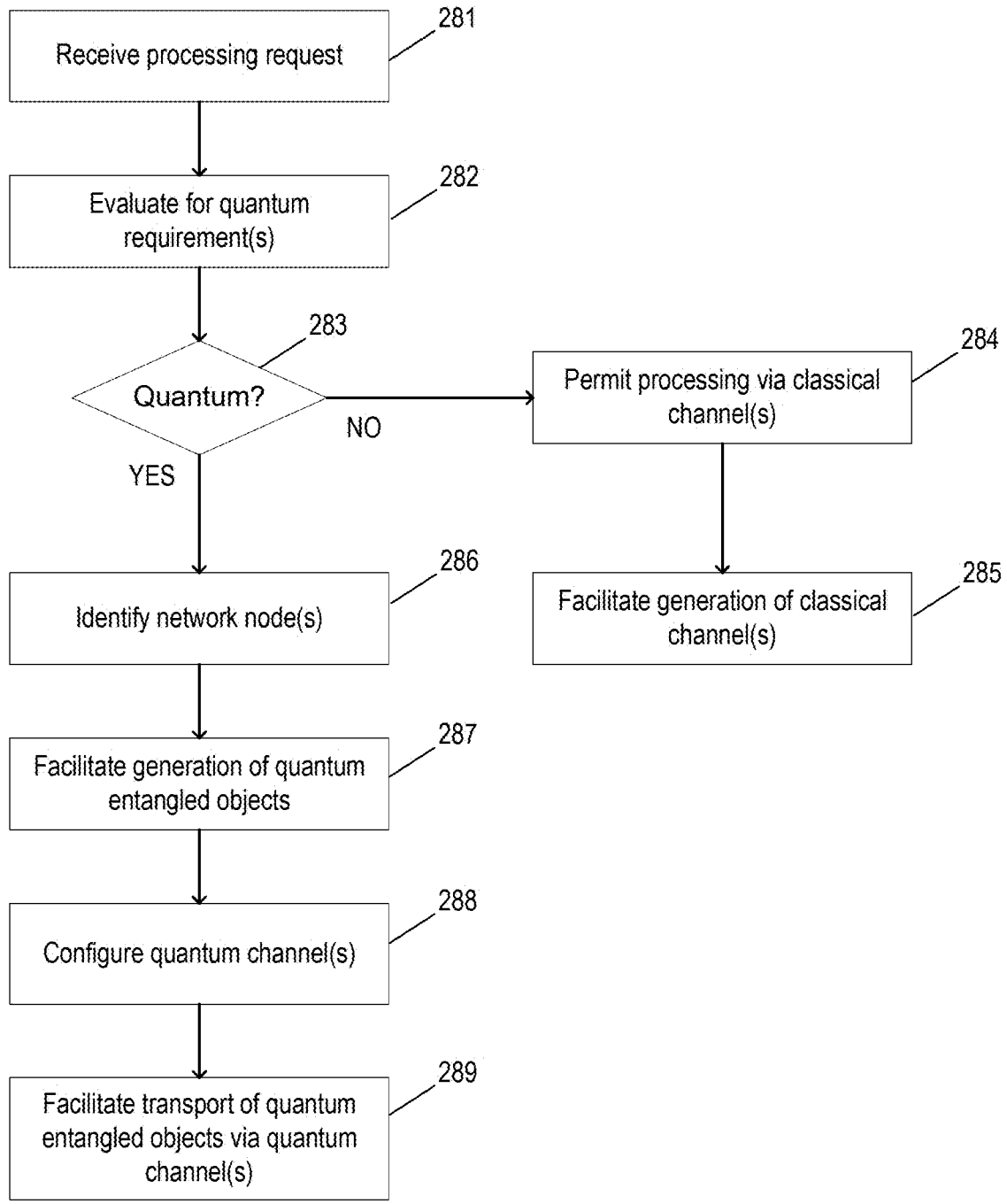
FIG. 2G depicts an illustrative embodiment of a process in accordance with various aspects described herein.

FIG. 2G depicts an illustrative embodiment of a process 280 in accordance with various aspects described herein. A processing request is received at 281. The processing request can be received, e.g., by a QA and or a quantum entanglement controller. The processing request can identify one or more of a source node, e.g., a first communication node of a communication link, a processing node of a processing link, and the like, sometimes referred to herein as a source node. For requests received at a QA of the source node, identification of the source node can be determined by the association of the QA with the source node, e.g., inference. For requests that relate to and/or otherwise result in processing on one or more other nodes, the request may identify one or more of the one or more other nodes. For example, a request for communication between a source node and destination node may identify the destination node. For applications in which communications between the source and destination include one or more intermediate nodes, the intermediate nodes may be included or otherwise identified within the request. In at least some embodiments the need and/or identification of intermediate nodes need not be identified within the request, e.g., being determined by another entity, such as the quantum entanglement controller, a quantum network and/or link.

It is understood that in at least some embodiments, the request does not indicate or otherwise identify any requirement for quantum entanglement. In this regard, an evaluation can be performed at 282 to determine whether the request is associated with quantum entanglement requirements. For example, quantum entanglement requirements can depend upon one or more of a source node identity and/or location, a destination node identity and/or location, an information source, e.g., sending user and/or destination, e.g., recipient user, sensitivity of the information to be processed, e.g., communicated, historical information obtained from previous processing requests, the quantity of information to be processed, time sensitivity of the processing, network status, e.g., traffic congestion, message delays, interference, capacity, and so on. In at least some embodiments, the request itself may identify that quantum entanglement is necessary, preferred and/or unnecessary, as the case may be.

A determination is made at 283 as to the existence of any quantum entanglement requirements for the requested connection, e.g., according to the results of the evaluation performed at 282. The evaluation at 282 and/or the determination at 283 can be performed according to pre-configured logic, policies and/or programming at one or more of the QA of the source node, a quantum entanglement controller, or a QA of another node, or in a distributed manner across different QAs and/or one or more QAs and the quantum entanglement controller.

To the extent it is determined at 283 that there are no quantum entanglement requirements, the requested connection is permitted at 284 to proceed via one or more classical communication channels, e.g., telecommunication channels, computer network channels, packet switched networks, circuit switched networks, the Internet, local area networks, public networks private networks, fiber optic networks, such as SONET, cable networks, satellite networks, and the like. Establishment of one or more classical communication channels can be provided at 285. For example, a channel can be requested, configured and/or otherwise identified according to one or more of the source and the destination. In at least some embodiments, selection and/or establishment of a particular classical channel may also depend upon one or more of a source node identity and/or location, a destination node identity and/or location, an information source, e.g., sending user and/or destination, e.g., recipient user, sensitivity of the information to be processed, e.g., communicated, historical information obtained from previous processing requests, the quantity of information to be processed, time sensitivity of the processing, network status, e.g., traffic congestion, message delays, interference, capacity, and so on.

To the extent it is determined at 283 that there do exist quantum entanglement requirements, one or more QENs are identified at 286. For example, a QEN of a processing node adapted to serve the requested processing may include or otherwise be associated with a QEN. Similarly, first and second QENs may be identified according to a source node and a destination node of a requested communication processing. It is envisioned that in at least some instances, one or more intermediate nodes, e.g., between the source and destination nodes, may be required.

In at least some embodiments, identification of the network nodes at 286 can be performed according to pre-configured logic, policies and/or programming at one or more of the QA of the source node, a quantum entanglement controller, or a QA of another node, or in a distributed manner across different QAs and/or one or more QAs and the quantum entanglement controller. For example, a determination of a processing node, such as a destination node of a communication processing request may depend upon the destination node having an associated QA and/or QEN. If an identified destination node is not provided with quantum entanglement capabilities, the request may be denied, and/or altered, e.g., according to the pre-configured logic or policies, to identify a replacement processing node including quantum entanglement capabilities. For example, a replacement node may be selected based upon a physical proximity to the original node. To the extent that intermediate nodes may be required, e.g., quantum repeaters, identification of the network nodes at 286 can be adapted to minimize complexity, e.g., by avoiding and/or minimizing a number of network nodes, e.g., intermediate nodes, that may be required.

Generation of one or more quantum entangled objects is facilitated at 287. Generation of quantum entangled objects can include any process or processes generally known to those skilled in the art, such as the example photon entanglement sources disclosed herein. Other examples of quantum entangled object sources are provide in U.S. patent application Ser. No. 16/211,809, filed on Dec. 6, 2018, entitled "Free-Space, Twisted Light Optical Communication System" and Ser. No. 16/426,891, filed on May 30, 2019, entitled "System and Method for Provisioning of Entangled-Photon Pairs." All sections of the aforementioned application(s) and patent(s) are incorporated herein by reference in their entirety.

One or more quantum channels are configured at 287. Quantum channels can include any communication channel or link adapted to transport a quantum entangled object, such as an entangled photon, without destroying or otherwise disturbing the entangled quantum state of a transported quantum entangled object to render it useless. Examples include selection of one or more point-to-point fiber optic links, free-space optical links, e.g., between QENs and/or between one or more QENs and a quantum entanglement source. Alternatively or in addition, configuration can include configuring one or more fiber optic networks, e.g., ring networks, star networks, and/or mesh networks, including any of the examples disclosed herein, equivalents, and the like, e.g., providing switch control and/or signaling commands.

Transport of one or more quantum entangled objects via the one or more configured quantum channels is facilitated at 287. For example, a quantum entanglement source is configured to distribute one entangled object, i.e., entangled photon, of a quantum entangled group of objects to a QEN of a source node, and another entangled object, i.e., photon, of the same quantum entangled group of objects to another QEN of a destination node. For applications involving intermediate nodes, e.g., quantum repeaters, transportation can include providing one or more additional quantum entangled objects to the intermediate node, e.g., repeater to facilitate entanglement swapping to support extension of a quantum enabled state between a source node and a destination node separate by a distance greater than can be physically realized using a single pair of quantum entangled objects, i.e., photons.

While for purposes of simplicity of explanation, the respective processes are shown and described as a series of blocks in FIG. 2G, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of communication network 100, the subsystems and functions of systems 200, 210, 220, 230, 240, 250 and process 280 presented in FIGS. 1, 2A, 2B, 2C, 2D, 2E, 2F, 2G and 3. For example, virtualized communication network 300 can facilitate in whole or in part a generation of entangled photons, responsive to a request for quantum entanglement, and efficient and reliable distribution of the entangled photons to predetermined processing nodes based on the request. Quantum agents are employed, that in at least some applications, evaluate communication and/or processing requests to determine whether quantum entanglement is required. Having identified communications and/or processing nodes to be entangled, one or more quantum channels are identified to support transportation of entangled objects from the entanglement source to remote destinations to facilitate quantum entanglement of endpoints of the requested link. It is envisioned that in at least some applications, one or more quantum repeaters may be necessary, in which case a swapping of quantum information or states can be employed to extent an entangled state between the source and the destination by way of the repeater. Accordingly, the quantum channels can be established between one or more of the quantum source, a source node, a destination node and possibly a quantum repeater node.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc., that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc., to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc., can be instantiated and managed using an orchestration approach similar to those used in cloud compute services.

The cloud computing environments 375 can interface with the virtualized network function cloud 325 via APIs that expose functional capabilities of the VNEs 330, 332, 334, etc., to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

In at least some embodiments, the virtualized communication network 300 is configured to establish quantum entanglement between various network elements to support quantum enabled functions, services and/or applications. For example, the virtualized communications network 300 includes a quantum source (QS) 362 adapted to generate a quantum entangled group of objects, such as entangled photons, responsive to a request for processing, e.g., communication between network elements and/or remote processing nodes, that utilizes quantum entanglement. Quantum agents (QA) 361a, 361b, 361c, 361d, generally 361, can be employed at one or more of the network elements, e.g., to evaluate communication and/or processing requests to determine whether quantum entanglement is desired. Likewise, the virtualized communications network 300 can include one or more quantum enabled nodes (QEN) 360*a*, 360*b*, 360*c*, 360*d*, generally 360, that are adapted to transmit, receive, measure, store and/or otherwise process quantum entangled objects according to any of the techniques disclosed herein, including those generally known to those skilled in the art of quantum processing.

For example, one or more of the virtual network elements 330, 333, 334 can include, be configured with, or otherwise associated with a respective QEN 360. It is envisioned that in at least some embodiments, such as data centers that may contain processing infrastructure that supports multiple VNEs 330. 332, 334 at one location, at least one QEN 360 can be shared between and/or otherwise associated with more than one VNEs 330, 332, 334. Alternatively or in addition one or more of the various access networks 110, 130, 120, 140, 175 and/or the transport layer 350 may be include and/or otherwise be associated with a QEN 360. Likewise, in at least some embodiments, one or more other cloud computing environments 374 may be include and/or otherwise be associated with a QEN 360. Associations of the QENs 360 in this manner extend quantum capabilities to system elements and subsystems of the virtualized communication network 300, including traditional or legacy system elements or subsystems.

In at least some embodiments, each QEN 360 includes or is otherwise associated with a respective QA 361. That said, it is envisioned that in at least some embodiments, a single QA 361 may be shared with multiple QENs 360, e.g., at a data center. Having identified communications and/or processing nodes of the virtualized communications network 300 to be entangled with other nodes of the network and/or other networks and/or systems, one or more quantum channels are identified to support transportation of the entangled objects from an entanglement source to remote destinations to facilitate quantum entanglement between endpoints of the requested link, e.g., according to the various techniques and examples disclosed herein, including the possibility of quantum repeater nodes, if deemed necessary.

Figure 4:
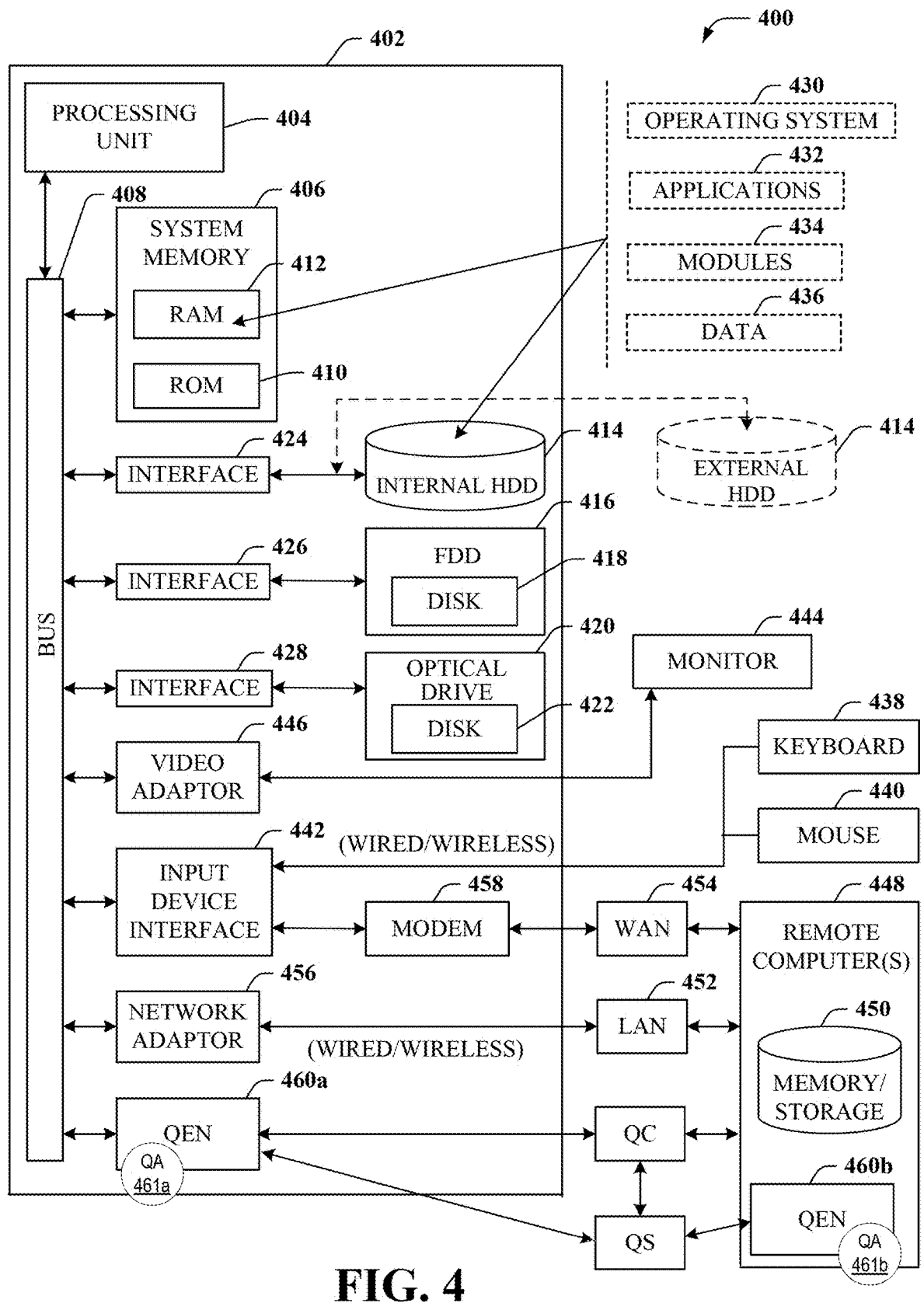
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part a generation of entangled photons, responsive to a request for quantum entanglement, and efficient and reliable distribution of the entangled photons to predetermined processing nodes based on the request. Quantum agents are employed, that in at least some applications, evaluate communication and/or processing requests to determine whether quantum entanglement is required. Having identified communications and/or processing nodes to be entangled, one or more quantum channels are identified to support transportation of entangled objects from the entanglement source to remote destinations to facilitate quantum entanglement of endpoints of the requested link. It is envisioned that in at least some applications, one or more quantum repeaters may be necessary, in which case a swapping of quantum information or states can be employed to extent an entangled state between the source and the destination by way of the repeater. Accordingly, the quantum channels can be established between one or more of the quantum source, a source node, a destination node and possibly a quantum repeater node.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

In at least some embodiments, the computing environment 400 is configured to engage and/or otherwise participate in quantum entanglement other computing environments, e.g., remote computers 448, systems and/or network elements to support quantum enabled functions, services and/or applications. For example, the computing 400 includes a quantum source (QS) 462 adapted to generate a quantum entangled group of objects, such as entangled photons, responsive to a request for processing, e.g., communication within the computing environment 400 and/or between the computing environment 400 and other computing environments, systems and/or network elements s, that utilizes quantum entanglement. A first quantum agents (QA) 461*a* can be included within or otherwise associated with the computer 402, and a second QA 461*b* can be included within or otherwise associated with the remote computer 448, e.g., to evaluate communication and/or processing requests to determine whether quantum entanglement is desired. Likewise, the computer 402 and/or the remote computer 448 can include one or more quantum enabled nodes (QEN) 460*a*, 460*b*, generally 460, that are adapted to transmit, receive, measure, store and/or otherwise process quantum entangled objects according to any of the techniques disclosed herein, including those generally known to those skilled in the art of quantum processing. According to the illustrative embodiments, the computing environment includes at least one quantum controller (QC) 464 adapted to respond to and/or otherwise service requests and/or determinations that quantum processing be implemented in association with the computing environment 400.

In at least some embodiments, each QEN 460*a*, 460*b*, generally 460, includes or is otherwise associated with a respective QA 461. That said, it is envisioned that in at least some embodiments, a single QA 461 may be shared with multiple QENs 460, e.g., among a computer 402 and one or more remote computers 448 at a proximate or common location, such as a data center. Having identified quantum entanglements for communications and/or processing between the computer 402, and/or the remote computer 448 and/or other networks and/or systems, one or more quantum channels are identified to support transportation of the entangled objects from an entanglement source to remote destinations to facilitate quantum entanglement between endpoints of the requested link, e.g., according to the various techniques and examples disclosed herein, including the possibility of quantum repeater nodes, if deemed necessary.

Figure 5:
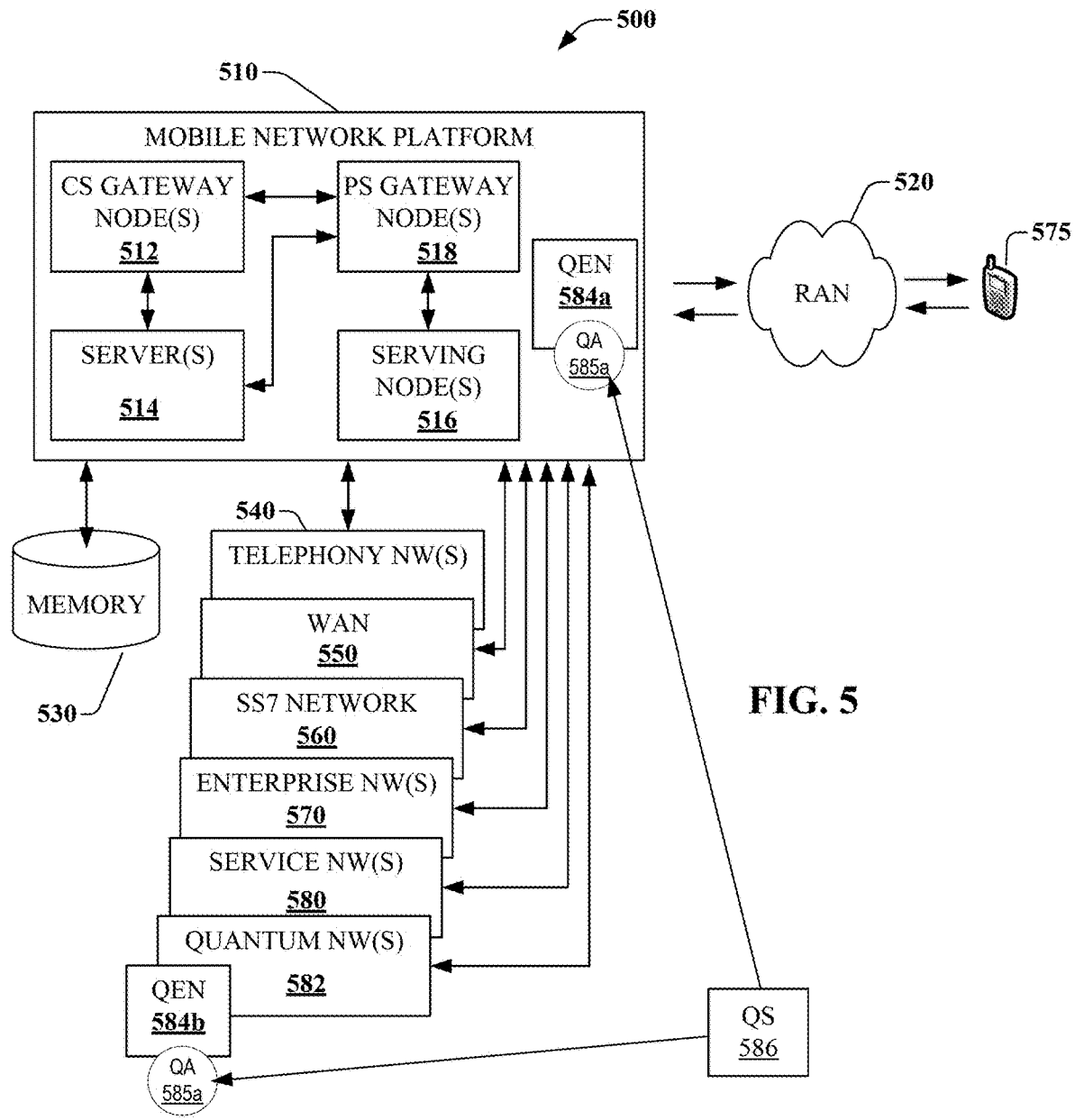
FIG. 5 is a block diagram of an example, non-limiting embodiment of a mobile network platform in accordance with various aspects described herein.

Turning now to FIG. 5, an embodiment of a mobile network environment 500 including a mobile network platform 510 is shown that is an example of network elements 150, 152, 154, 156, and/or VNEs 330, 332, 334, etc. For example, platform 510 can facilitate in whole or in part a generation of entangled photons, responsive to a request for quantum entanglement, and efficient and reliable distribution of the entangled photons to predetermined processing nodes based on the request. Quantum agents are employed, that in at least some applications, evaluate communication and/or processing requests to determine whether quantum entanglement is required. Having identified communications and/or processing nodes to be entangled, one or more quantum channels are identified to support transportation of entangled objects from the entanglement source to remote destinations to facilitate quantum entanglement of endpoints of the requested link. It is envisioned that in at least some applications, one or more quantum repeaters may be necessary, in which case a swapping of quantum information or states can be employed to extent an entangled state between the source and the destination by way of the repeater. Accordingly, the quantum channels can be established between one or more of the quantum source, a source node, a destination node and possibly a quantum repeater node.

In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through network(s) associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc., that perform particular tasks and/or implement particular abstract data types.

In at least some embodiments, the mobile network platform 510 is configured to engage and/or otherwise participate in quantum entanglement other computing environments, e.g., remote computers, systems and/or other networks, such as quantum networks 582, to support quantum enabled functions, services and/or applications. For example, the mobile network platform 510 includes a quantum source (QS) 584*a* adapted to generate a quantum entangled group of objects, such as entangled photons, responsive to a request for processing, e.g., communication within the mobile network platform 510 and/or between the mobile network platform 510 and other computing environments, systems and/or network 582, that utilizes quantum entanglement. A first quantum agents (QA) 585*a* can be included within or otherwise associated with the mobile network platform 510, and a second QA 585*b* can be included within or otherwise associated with the quantum network 582, e.g., to evaluate communication and/or processing requests to determine whether quantum entanglement is desired. Likewise, the mobile network platform 510 and/or the quantum network 582 can include one or more quantum enabled nodes (QEN) 584*a*, 584*b*, generally 584, that are adapted to transmit, receive, measure, store and/or otherwise process quantum entangled objects according to any of the techniques disclosed herein, including those generally known to those skilled in the art of quantum processing. According to the illustrative embodiments, the mobile network environment 500 includes at least one quantum controller (QC) 586 adapted to respond to and/or otherwise service requests and/or determinations that quantum processing be implemented in association with the mobile network environment 500.

In at least some embodiments, each QEN 584, includes or is otherwise associated with a respective QA 585*a*, 585*b*, generally 585. That said, it is envisioned that in at least some embodiments, a single QA 585 may be shared with multiple QENs 584, e.g., among a mobile network platform 510 and one or more remote quantum networks 582 at a proximate or common location, such as a data center. Having identified quantum entanglements for communications and/or processing between the mobile network platform 510, and/or the remote quantum network 582 and/or other networks and/or systems, one or more quantum channels are identified to support transportation of the entangled objects from an entanglement source to remote destinations to facilitate quantum entanglement between endpoints of the requested link, e.g., according to the various techniques and examples disclosed herein, including the possibility of quantum repeater nodes, if deemed necessary.

Figure 6:
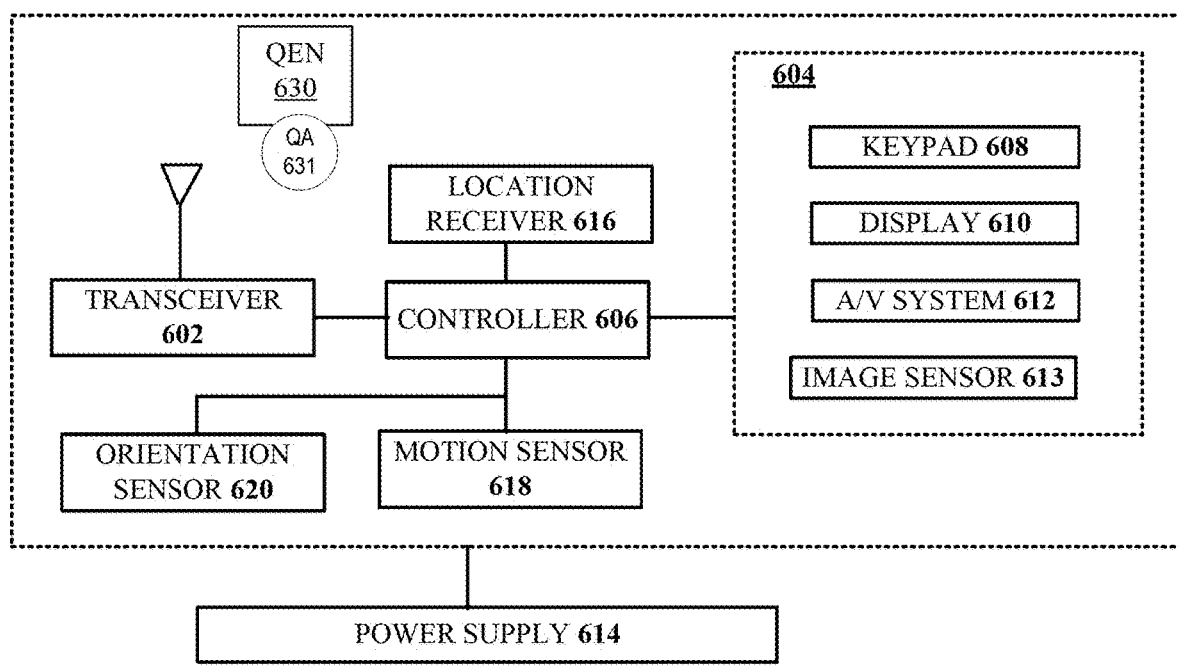
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part a generation of entangled photons, responsive to a request for quantum entanglement, and efficient and reliable distribution of the entangled photons to predetermined processing nodes based on the request. Quantum agents are employed, that in at least some applications, evaluate communication and/or processing requests to determine whether quantum entanglement is required. Having identified communications and/or processing nodes to be entangled, one or more quantum channels are identified to support transportation of entangled objects from the entanglement source to remote destinations to facilitate quantum entanglement of endpoints of the requested link. It is envisioned that in at least some applications, one or more quantum repeaters may be necessary, in which case a swapping of quantum information or states can be employed to extent an entangled state between the source and the destination by way of the repeater. Accordingly, the quantum channels can be established between one or more of the quantum source, a source node, a destination node and possibly a quantum repeater node.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In at least some embodiments, the communication device 600 is configured to engage and/or otherwise participate in quantum entanglement other computing environments, e.g., remote computers, systems and/or other networks to support quantum enabled functions, services and/or applications. For example, the communication device 600 includes a quantum agent (QA) 631 that can be included within or otherwise associated with the communication device 600, e.g., to evaluate communication and/or processing requests to determine whether quantum entanglement is desired. Likewise, the communication device 600 can include a quantum enabled node (QEN) 630, adapted to transmit, receive, measure, store and/or otherwise process quantum entangled objects according to any of the techniques disclosed herein, including those generally known to those skilled in the art of quantum processing.

The QEN 630 can be in communication with a quantum source (QS), adapted to generate a quantum entangled group of objects, such as entangled photons, responsive to a request for processing, e.g., communication within the communication device 600 and/or between the communication device 600 and other communication devices, computing environments, systems and/or network, that utilizes quantum entanglement.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

Other techniques related to applications of quantum entanglement are disclosed in U.S. patent application Ser. No. 16/706,295, entitled "Quantum Enabled Hybrid Fiber Cable Loop", filed on Dec. 6, 2019, all sections thereof incorporated herein by reference in their entirety.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable programmable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A system, comprising:
a processing system including a processor; and
a memory that stores executable instructions that, when executed by the processing system, facilitate performance of operations, the operations comprising:
  determining to provide a quantum channel for communications between a first communication node and a second communication node;
  identifying a first network routing path of a plurality of network routing paths, wherein quantum entanglement is established between the first and second communication nodes based on transportation of a first quantum entangled photon of a first pair of quantum entangled photons via the first network routing path;
  initiating a classical communication channel between the first and second communication nodes, the classical communication channel adapted to communicate quantum state information to facilitate an exchange of information between the first and second communication nodes via the quantum channel;
  determining a first location of the first communication node and a second location of the second communication node; and
  identifying a quantum source, the quantum source configured to generate the first pair of quantum entangled photons based on the first location of the first communication node, wherein the first network routing path extends between the quantum source and the first communication node, the first network routing path transporting a second quantum entangled photon of the first pair of quantum entangled photons to the first communication node.

2. The system of claim 1, wherein identifying of the first network routing path of the plurality of network routing paths further comprises:
  identifying a second network routing path of the plurality of network routing paths based on the second location of the second communication node, the second network routing path transporting the first quantum entangled photon of the first pair of quantum entangled photons to the second communication node.

3. The system of claim 1, wherein the operations further comprise:
  generating signaling information based on the identifying of the first network routing path; and
  providing the signaling information to a configurable switch, wherein configuration of the configurable switch according to the signaling information facilitates establishment of the first network routing path of the plurality of network routing paths.

4. The system of claim 3, wherein the signaling information is provided to the configurable switch via a control channel.

5. The system of claim 4, wherein the control channel is physically separate from the quantum channel.

6. The system of claim 5, wherein the first pair of quantum entangled photons comprises a first pair of quantum entangled photons, and wherein the quantum channel comprises a fiber optic communications channel.

7. The system of claim 6, wherein the control channel comprises a powerline communication channel.

8. The system of claim 1, wherein the first network routing path of the plurality of network routing paths comprises a quantum repeater, the quantum repeater extending entanglement between the first communication node and the second communication node according to a second pair of quantum entangled photons.

9. The system of claim 8, wherein the first network routing path comprises a quantum repeater the quantum repeater, quantum entanglement being further established between the first communication node and the quantum repeater based on entanglement swapping based on the second pair of quantum entangled photons at the quantum repeater, wherein the exchange of information occurs between the first communication node and the second communication node via the quantum channel according to the transported first quantum entangled photon of the first pair of quantum entangled photons and according to the entanglement swapping based on the second pair of quantum entangled photons.

10. A method, comprising:
  determining, by a processing system including a processor, that requested communications between a first communication node and a second communication node are to be established via quantum teleportation between the first communication node and the second communication node;
  identifying, by the processing system, a network path of a plurality of network paths according to a quantum channel, wherein quantum entanglement is established between the first and second communication nodes based on transportation of a first quantum entangled object of a first group of quantum entangled objects via a first path segment of the network path;
  facilitating, by the processing system, a classical communication channel between the first and second communication nodes, to carry an exchange of quantum state information that facilitates an exchange of information between the first and second communication nodes via the quantum channel;
  determining, by the processing system, a first location of the first communication node and a second location of the second communication node; and
  identifying, by the processing system, a quantum source, the quantum source configured to generate the first group of quantum entangled objects based on the first location of the first communication node, wherein the first path segment extends between the quantum source and the first communication node, the first path segment transporting the first quantum entangled object to the first communication node.

11. The method of claim 10, wherein identifying of the network path of the plurality of network paths further comprises:
  identifying, by the processing system, a second path segment based on the second location of the second communication node, the second path segment transporting a second quantum entangled object of the first group of quantum entangled objects to the second communication node.

12. The method of claim 10, further comprising:
  generating, by the processing system, signaling information based on the identifying of the network path; and
  providing, by the processing system, the signaling information to a configurable switch, wherein configuration of the configurable switch according to the signaling information facilitates establishment of the network path of the plurality of network paths.

13. The method of claim 12, wherein the signaling information is provided to the configurable switch via a control channel.

14. The method of claim 10, wherein the network path of the plurality of network paths comprises a quantum repeater, the quantum repeater extending entanglement between the first communication node and the second communication node according to a second group of quantum entangled objects.

15. A non-transitory, machine-readable medium, comprising executable instructions that, when executed by a processing system including a processor, facilitate performance of operations, the operations comprising:
  determining that communications are to be established via quantum teleportation between a first processing node and a second processing node responsive to a request to facilitate the communications between the first and a second processing nodes;
  identifying a network path comprising a first path segment to obtain a quantum channel, wherein quantum entanglement is established between the first and second processing nodes based on transportation of a first quantum entangled object of a group of quantum entangled objects via the quantum channel;
  facilitating a classical communication channel between the first and second processing nodes, adapted to exchange quantum state information of a measurement performed upon the first quantum entangled object wherein information is exchanged between the first and second processing nodes via the quantum channel;
  determining a first location of the first processing node and a second location of the second processing node; and
  identifying a quantum source, the quantum source configured to generate the group of quantum entangled objects based on the first location of the first processing node, wherein the first path segment extends between the quantum source and the first processing node, the first path segment transporting the first quantum entangled object to the first processing node.

16. The non-transitory, machine-readable medium of claim 15, wherein identifying of the network path further comprises:
  identifying a second path segment based on the second location of the second processing node, the second path segment transporting a second qubit of the first quantum entangled object to the second processing node.

17. The non-transitory, machine-readable medium of claim 16, further comprising:
  generating signaling information based on the identifying of the first path segment and the second path segment; and
  providing the signaling information to a configurable switch, wherein configuration of the configurable switch according to the signaling information facilitates establishment of the first path segment and the second path segment.

18. The system of claim 8, wherein the first pair of quantum entangled photons and the second pair of quantum entangled photons originate from the quantum source.

19. The method of claim 11, wherein the first quantum entangled object and the second quantum entangled object are generated by the quantum source.

20. The non-transitory, machine-readable medium of claim 16, wherein the group of quantum entangled object are provided by the quantum source.

* * * * *